US009256507B2

(12) United States Patent
Takaoka et al.

(10) Patent No.: US 9,256,507 B2
(45) Date of Patent: Feb. 9, 2016

(54) COMPUTER SYSTEM AND ITS EVENT NOTIFICATION METHOD

(71) Applicant: Hitachi, Ltd., Tokyo (JP)

(72) Inventors: Nobumitsu Takaoka, Sagamihara (JP); Masaaki Iwasaki, Tachikawa (JP); Shoji Kodama, Yokohama (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/340,760

(22) Filed: Jul. 25, 2014

(65) Prior Publication Data

US 2014/0337675 A1    Nov. 13, 2014

Related U.S. Application Data

(63) Continuation of application No. 13/139,122, filed as application No. PCT/JP2011/003065 on May 31, 2011, now Pat. No. 8,793,707.

(51) Int. Cl.
    G06F 3/00      (2006.01)
    G06F 9/44      (2006.01)
    G06F 9/46      (2006.01)
    G06F 13/00     (2006.01)
    G06F 11/30     (2006.01)
    H04L 12/24     (2006.01)
    G06F 11/07     (2006.01)
    H04L 29/08     (2006.01)
    (Continued)

(52) U.S. Cl.
    CPC ........ *G06F 11/3079* (2013.01); *G06F 11/0712* (2013.01); *G06F 11/0727* (2013.01); *G06F 11/0751* (2013.01); *G06F 11/0787* (2013.01); *H04L 41/50* (2013.01); *H04L 41/5035* (2013.01); *H04L 67/1097* (2013.01); *H04L 69/40* (2013.01); *G06F 11/201* (2013.01); *G06F 11/2015* (2013.01); *H04L 41/0213* (2013.01)

(58) Field of Classification Search
    None
    See application file for complete search history.

(56) References Cited

U.S. PATENT DOCUMENTS

7,406,622 B2 *  7/2008  Yamamoto et al. ............ 714/6.1
7,506,375 B2    3/2009  Kanda et al.
(Continued)

FOREIGN PATENT DOCUMENTS

JP   2007-141171 A   6/2007
JP   2007-172003 A   7/2007
(Continued)

*Primary Examiner* — H S Sough
*Assistant Examiner* — William C Wood
(74) *Attorney, Agent, or Firm* — Volpe and Koenig, P.C.

(57) ABSTRACT

If a failure occurs in physical resources constituting a virtual volume, a management server device is notified of information required by a user. A computer system includes a server device for managing a plurality of virtual volumes, a storage apparatus having a storage unit equipped with a plurality of storage devices, and a controller for controlling data input to, or output from, the storage unit, a management server device which is an access target of a user terminal, and an event management device for managing an event(s) generated by the server device or the storage apparatus, wherein when the event management device receives the event, it judges the content of the event and identifies a virtual volume to be affected by the event; and if a service level that should be satisfied by the identified virtual volume is defined for the identified virtual volume, the event management device identifies, based on the content of the received event, whether an incident in violation of the service level has occurred or not, and then notifies the management server device of the identified content as an event based on an event filter.

9 Claims, 30 Drawing Sheets

(51) Int. Cl.
    *H04L 29/14*       (2006.01)
    *G06F 11/20*       (2006.01)

(56)            References Cited

U.S. PATENT DOCUMENTS 7,702,951   B2   4/2010   Yamamoto et al.
    2003/0135609 A1  7/2003   Carlson et al.
    2004/0243699 A1  12/2004  Koclanes et al.
    2007/0174721 A1  7/2007   Yamamoto et al.
    2010/0122125 A1  5/2010   Yamamoto et al.

FOREIGN PATENT DOCUMENTS

JP          4130615 A    5/2008
    JP          2011-039740 A  2/2011

* cited by examiner

FIG.9

| ID | TYPE | SUBORDINATE RESOURCE ID | DOMAIN ID |
|---|---|---|---|
| PV0 | REAL VOLUME | RG0 | |
| PV1 | REAL VOLUME | RG0 | |
| PV2 | REAL VOLUME | RG0 | |
| PV3 | REAL VOLUME | RG1 | |
| PV4 | REAL VOLUME | RG1 | |
| PV5 | REAL VOLUME | RG1 | |
| VV0 | VIRTUAL VOLUME | PV0, PV1, SV0 | DM0 |
| VV1 | VIRTUAL VOLUME | PV2, PV3, SV0 | DM0 |
| VV2 | VIRTUAL VOLUME | PV4, SV0 | DM1 |
| VV3 | VIRTUAL VOLUME | PV5, SV0 | DM1 |
| RG0 | RAID GROUP | HD0, HD1, HD2, HD3 | |
| RG1 | RAID GROUP | HD4, HD5, HD6, HD7 | |
| VM1 | VIRTUAL SERVER | SV0 | DM0 |
| VM2 | VIRTUAL SERVER | SV0 | DM1 |

FIG.10

| ID | TYPE | SUPERIOR RESOURCE ID | STATUS |
|---|---|---|---|
| SV0 | SERVER DEVICE | | NORMAL |
| HB0 | HBA | SV0 | NORMAL |
| HB1 | HBA | SV0 | NORMAL |
| HP00 | HOST PORT | HB0 | NORMAL |
| HP01 | HOST PORT | HB0 | NORMAL |
| HP10 | HOST PORT | HB1 | NORMAL |
| HP11 | HOST PORT | HB1 | NORMAL |
| ST0 | STORAGE APPARATUS | | NORMAL |
| HD0 | HDD | ST0 | NORMAL |
| HD1 | HDD | ST0 | NORMAL |
| HD2 | HDD | ST0 | NORMAL |
| HD3 | HDD | ST0 | NORMAL |
| HD4 | HDD | ST0 | NORMAL |
| HD5 | HDD | ST0 | NORMAL |
| HD6 | HDD | ST0 | NORMAL |
| HD7 | HDD | ST0 | NORMAL |
| CT0 | CONTROLLER | ST0 | NORMAL |
| CT1 | CONTROLLER | ST0 | NORMAL |
| CP00 | CONTROLLER PORT | CT0 | NORMAL |
| CP01 | CONTROLLER PORT | CT0 | NORMAL |
| CP10 | CONTROLLER PORT | CT1 | NORMAL |
| CP11 | CONTROLLER PORT | CT1 | NORMAL |
| PS00 | POWER SOURCE | ST0 | NORMAL |
| PS01 | POWER SOURCE | ST0 | NORMAL |

| ID | CONNECTED TARGET ID | TYPE |
|---|---|---|
| PV0 | CP00, CP10 | LUN |
| PV1 | CP00, CP10 | LUN |
| PV2 | CP00, CP10 | LUN |
| PV3 | CP10, CP11 | LUN |
| PV4 | CP10, CP11 | LUN |
| PV5 | CP10, CP11 | LUN |
| CP00 | SP02 | CABLE |
| CP01 | SP03 | CABLE |
| CP10 | SP12 | CABLE |
| CP11 | SP13 | CABLE |
| HP00 | SP00 | CABLE |
| HP01 | SP01 | CABLE |
| HP10 | SP10 | CABLE |
| HP11 | SP11 | CABLE |

FIG. 16

CREATION OF VIRTUAL VOLUME [ USER ID: xxxyyyzzz / DOMAIN A ]

BASIC SETTINGS

CAPACITY: [____] TB

SERVICE LEVEL:
- PERFORMANCE: ○ A  ○ B  ○ C  ○ NONE
- AVAILABILITY: ○ A  ○ B  ○ C  ○ NONE
- RELIABILITY: ○ A  ○ B  ○ C  ○ NONE
- BACKUP: ○ 1  ○ 5  ○ 10  ○ NONE

VIRTUAL SERVER: [____]

EVENT NOTIFICATION SETTINGS

CONDITIONS FOR NOTIFICATION:

■PERFORMANCE:
CASE WHERE ALL APPLIES
SERVICE LEVEL VIOLATION
ONLY ONE HOUR OR LONGER RESTORATION TIME
ONLY ONE DAY OR LONGER RESTORATION TIME
■AVAILABILITY:
CASE WHERE ALL APPLIES
SERVICE LEVEL VIOLATION
ONLY ONE HOUR OR LONGER RESTORATION TIME
ONLY ONE DAY OR LONGER RESTORATION TIME
■RELIABILITY:
CASE WHERE ALL APPLIES
SERVICE LEVEL VIOLATION
ONLY ONE HOUR OR LONGER RESTORATION TIME
ONLY ONE DAY OR LONGER RESTORATION TIME
■BACKUP:
CASE WHERE ALL APPLIES
SERVICE LEVEL VIOLATION
ONLY ONE HOUR OR LONGER RESTORATION TIME
ONLY ONE DAY OR LONGER RESTORATION TIME

FIG.31

| ID | TYPE | SUBORDINATE RESOURCE ID | DOMAIN ID |
|---|---|---|---|
| PV0 | REAL VOLUME | LS0 | |
| PV1 | REAL VOLUME | LS0 | |
| PV2 | REAL VOLUME | LS1 | |
| PV3 | REAL VOLUME | LS1 | |
| PV4 | REAL VOLUME | LS1 | |
| PV5 | REAL VOLUME | LS1 | |
| VV0 | VIRTUAL VOLUME | PV0 | DM0 |
| VV1 | VIRTUAL VOLUME | PV1 | DM0 |
| VV2 | VIRTUAL VOLUME | PV2 | DM0 |
| VV3 | VIRTUAL VOLUME | PV3 | DM1 |
| VV4 | VIRTUAL VOLUME | PV4 | DM1 |
| VV5 | VIRTUAL VOLUME | PV5 | DM1 |

FIG.32

| VIRTUAL VOLUME ID | RECEIVED LOGICAL MESSAGES |
|---|---|
| VV0 | PERFORMANCE DEGRADATION<br>RELIABILITY DEGRADATION<br>AVAILABILITY DEGRADATION |
| VV2 | PERFORMANCE DEGRADATION<br>RELIABILITY DEGRADATION |
| VV3 | RELIABILITY DEGRADATION<br>BACKUP AVAILABILITY DEGRADATION |

COMPUTER SYSTEM AND ITS EVENT NOTIFICATION METHOD

TECHNICAL FIELD

The present invention relates to a computer system having a storage apparatus and a server device, and to an event notification method for the computer system.

BACKGROUND ART

With a computer system having a storage apparatus and a server device, real volumes composed of storage areas in storage devices are virtualized as virtual volumes and the virtualized virtual volumes are provided to a user terminal which is an access requestor. Under this circumstance, a user can operate desired applications by accessing the virtual volumes, using the user terminal.

A virtualization device (hereinafter sometimes referred to as the virtualization mechanism) for virtualizing real volumes to obtain virtual volumes is implemented in, for example, a server device having a hypervisor, a SAN (Storage Area Network) switch, or a storage apparatus.

Meanwhile, in some case when managing virtual volumes, the correspondence relationship between a plurality of real volumes and a plurality of virtual volumes is registered in a volume management table and a management server manages the correspondence relationship between each real volume and each virtual volume by using the volume management table.

There is a suggested management server designed in such a manner that when receiving failure notice at the time of the occurrence of a failure in a real volume or a virtual volume under the above-described circumstance, the management server refers to the volume management table based on the failure notice about the real volume or the failure notice about the virtual volume, identifies the virtual volume corresponding to the real volume, in which the failure occurred, associates the failure notice about the virtual volume with the failure notice about the real volume, and outputs information, which associates the failure notice about the virtual volume with the failure notice about the real volume, to a terminal of an administrator (see Patent Literature 1).

If a failure occurs in physical resources, such as storage devices, which constitute a virtual volume, a server device for managing virtual volumes masks the failure by using an alternate storage device or an alternate path and restores the failure on the background so that applications can continue to operate.

CITATION LIST

Patent Literature

[PTL 1]
Japanese Patent No. 4130615

SUMMARY OF INVENTION

Technical Problem

If a failure occurs in physical resources constituting a virtual volume, the conventional technology gives no consideration to provision of only information in violation of a communication service agreement entered between a service provider and a user (hereinafter referred to as the Service Level Agreement [SLA]) to a terminal of the user who uses virtual volumes.

For example, if a failure occurs in physical resources constituting a virtual volume, redundancy may be temporarily lost, the performance of the virtual volume may degrade, or the SLA may be violated, depending on the fault of the storage device, after the occurrence of the failure until the restoration of the failure.

Under this circumstance, some user may strictly define the SLA and use virtual volumes and virtual servers on the assumption of the environment envisaged by the SLA. If a failure due to a violation of the SLA occurs, it is desirable that such a user should be promptly notified of the content of the SLA violation. This is because the user may sometimes wish to deal with the SLA violation by themselves. For example, if performance degradation of the virtual volume is predicted, there is a possibility that the user themselves may deal with the situation by, for example, increasing the number of the virtual volumes or the number of the virtual servers or by using other virtual volumes whose performance is not affected.

The present invention was devised in light of the problems of the conventional technology and it is an object of the invention to provide a computer system and its event notification method capable of notifying a device, which provides an access requestor with virtual volumes, of information required by a user if a failure occurs in physical resources constituting a virtual volume.

Solution to Problem

In order to achieve the above-described object, a computer system according to the present invention includes a server device for managing a plurality of virtual volumes, a storage apparatus for controlling data input to, or output from, a plurality of storage devices, a management server device for managing the virtual volumes as access targets of an access requestor, and an event management device for managing at least the server device or the storage apparatus as a management target and managing an event generated by the management target, wherein when the event management device receives the event, it judges the content of the event and identifies a virtual volume to be affected by the event, from among the virtual volumes; and if a service level that should be satisfied by the identified virtual volume is defined for the identified virtual volume, the event management device identifies, based on the content of the received event, whether an incident in violation of the service level has occurred or not, and then notifies the management server device of the identified content as an event based on an event filter.

Advantageous Effects of Invention

According to the present invention, it is possible to notify a device, which provides an access requestor with virtual volumes, of information required by a user.

BRIEF DESCRIPTION OF DRAWINGS

FIG. 9 is a configuration diagram of logical resource information.

FIG. 10 is a configuration diagram of physical resource information.

FIG. 16 is a screen configuration diagram showing a display example of a logical resource allocation screen.

FIG. 31 is a configuration diagram of information resource information.

FIG. 32 is a configuration diagram showing another embodiment of event filter information.

DESCRIPTION OF EMBODIMENTS

Overview of the Invention

The overview of the present invention will be explained with reference to a block diagram of FIG. 1.

Figure 1:
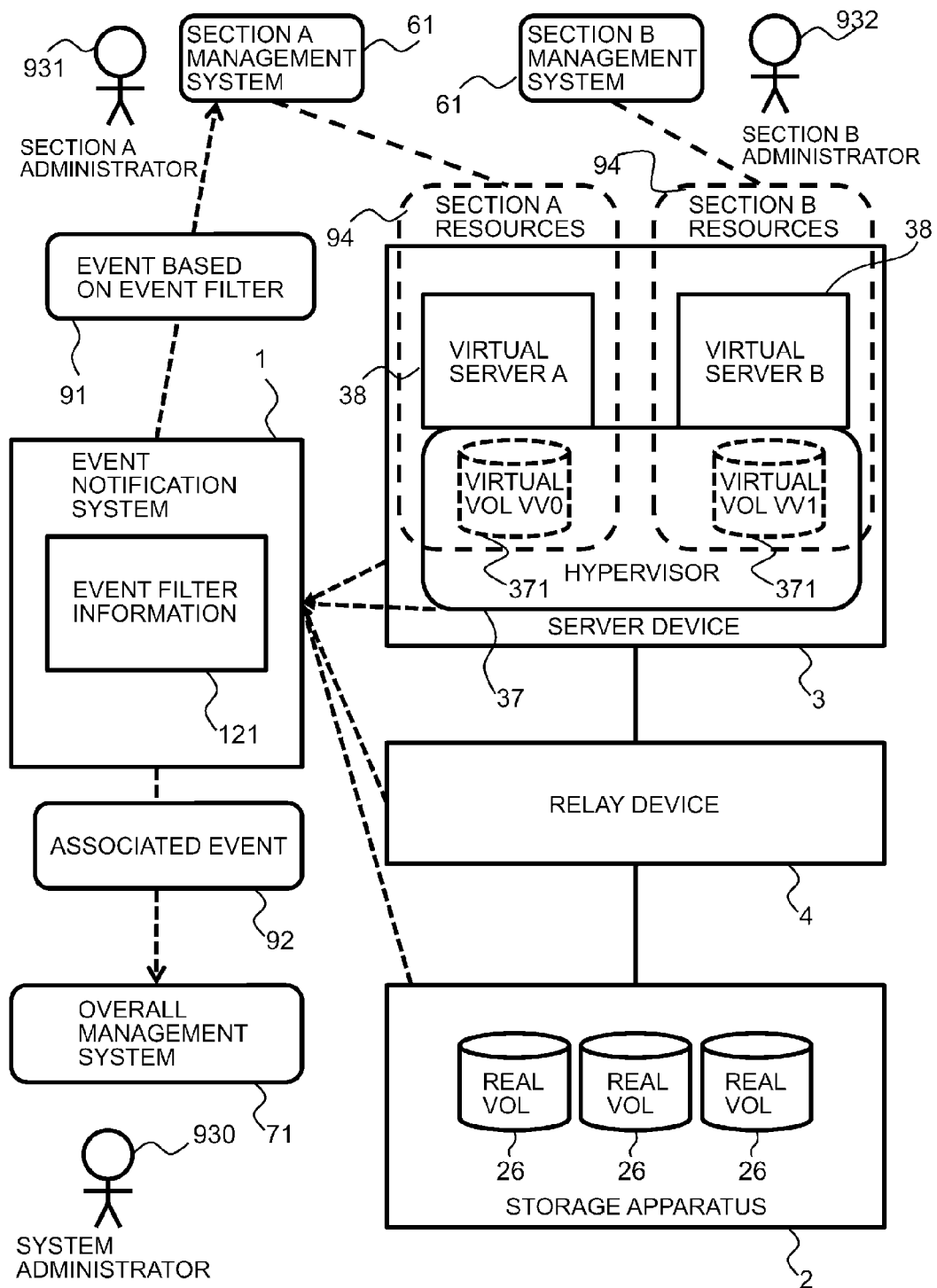
FIG. 1 is a block diagram explaining the overview of the present invention.

Referring to FIG. 1, a computer system includes an event notification system 1, a storage apparatus 2, a server device 3, and a relay device 4.

The server device 3 sends/receives information to/from the storage apparatus 2 via the relay device 4; and generates an event if a failure occurs in any of a plurality of server resources constituting the server device 3. This server device 3 is equipped with a hypervisor 37 having a function as a virtualization device and a plurality of virtual servers (#A, #B) 38 operating on the hypervisor 37. The event herein means an event including information indicating the content of the failure and information for identifying a failure occurrence site. Event notification can be implemented by using a trap defined by SNMP (Simple Network Management Protocol). The event notification can also be implemented by using a dedicated protocol other than SNMP. Furthermore, the same applies to events reported by various devices described below.

The hypervisor 37 virtualizes a plurality of real volumes 26, which are composed of storage areas of storage devices (not shown) in the storage apparatus 2, to obtain a plurality of virtual volumes (VV0, VV1) 371 which are composed of virtual storage areas; and manages the plurality of virtualized virtual volumes 371. Each virtual volume 371 is managed by, for example, a virtual server #A 38 and a virtual server #B 38. The virtual server #A 38 and the virtual volume (VV0) 371 are configured as section A resources 94 and are managed by a section A management system 61.

The virtual server #B 38 and the virtual volume (VV1) 371 are configured as section B resources 94 and are managed by a section B management system 61. Information about the section A management system 61 is provided via a network (not shown) to a user terminal (not shown) used by the section A administrator 931 and information about the section B management system 61 is provided via a network (not shown) to a user terminal (not shown) used by the section B administrator 932.

The relay device 4 relays information or data sent and received between the server device 3 and the storage apparatus 2; and if a failure occurs in any of a plurality of relay resources constituting the relay device 4, the relay device 4 generates an event.

The storage apparatus 2 has a plurality of real volumes 26 and a controller (not shown) for controlling data input to, or output from, each real volume 26; and if a failure occurs in any of the plurality of storage resources constituting the storage apparatus 2, the storage apparatus 2 generates an event.

If an event is generated by any of the storage apparatus 2, the server device 3, or the relay device 4, the event notification system 1 receives the generated event, judges the content of the received event, and identifies a virtual volume to be affected by the generation of the event, for example, the virtual volume (VV0) 371, from among the plurality of virtual volumes 371.

If a service level which should be satisfied by the identified virtual volume (VV0) 371 is defined for the identified virtual volume (VV0) 371 under the above-described circumstance, the event notification system 1 identifies, based on the content of the received event, whether an incident in violation of the defined service level has occurred or not; and notifies the section A management system 61 of the identified content, as an event 91 based on an event filter, in accordance with event filter information 121. The definition of the service level with respect to the virtual volumes is recorded in service level information (not shown). Consequently, the section A administrator 931 can recognize the occurrence of an incident in violation of the SLA by accessing the section A management system 61, using the user terminal.

Furthermore, the event notification system 1 notifies an overall management system 71 of the event received from the device, associates this event with the event 91 identified as described above based on the event filter to obtain an associated event 92, and notifies the overall management system 71 of the associated event 92. As a result, the system administrator 930 for managing the entire system can recognize the occurrence of an incident in violation of the service level and the content of failure information, which associates this violation incident with the site where the failure occurred, by operating the overall management system 71, using a system administrator terminal (not shown).

Overall Configuration

Figure 2:
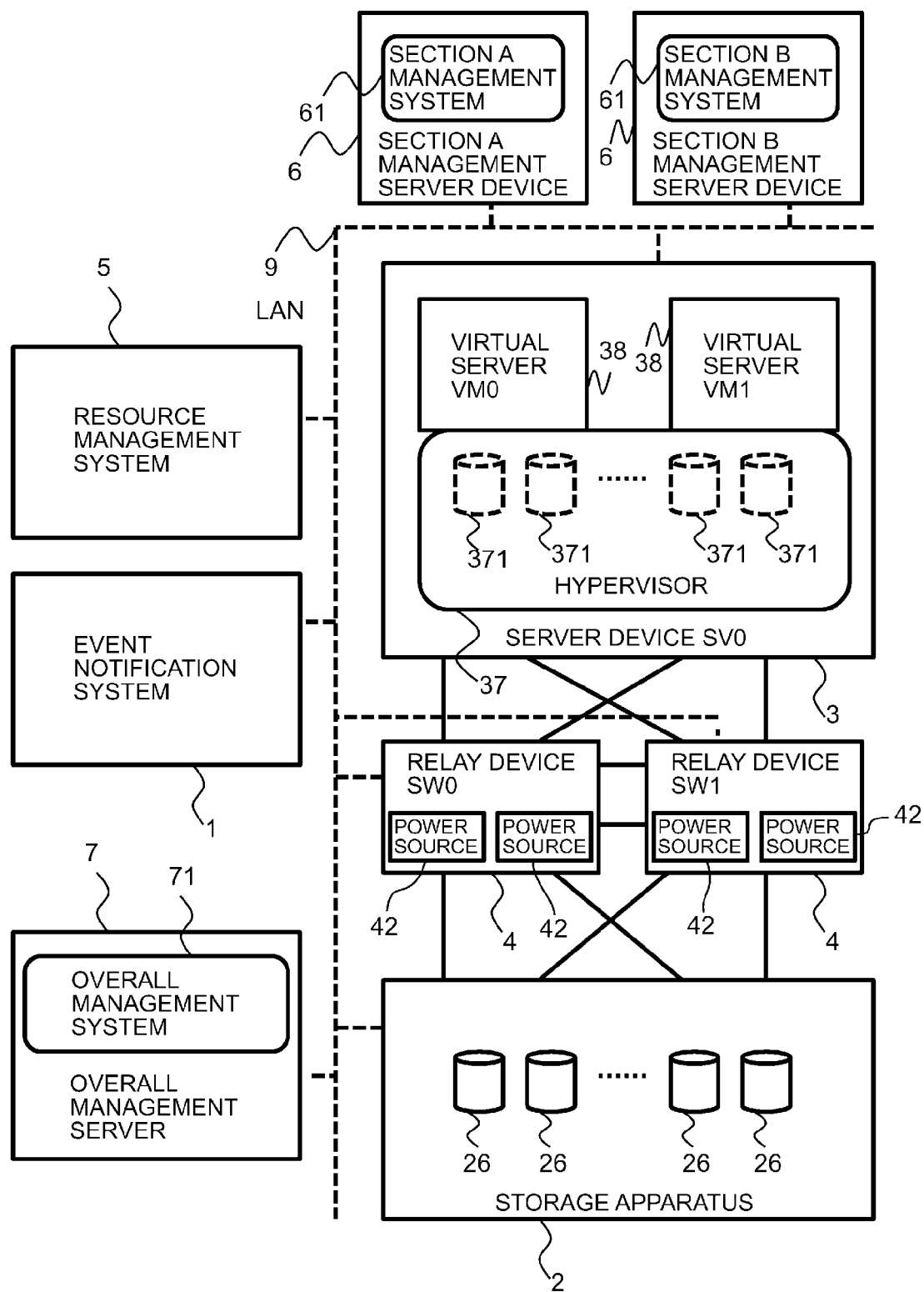
FIG. 2 is a block diagram showing the overall configuration of a computer system according to a first embodiment.

Next, FIG. 2 shows a block configuration diagram of the computer system according to the first embodiment.

Referring to FIG. 2, the computer system includes the event notification system 1, the storage apparatus 2, the server device 3, a plurality of relay devices (SW0, SW1) 4, a resource management system 5, the section A management server device 6, the section B management server device 6, and an overall management server 7; and the respective elements are connected via an internal network 9. For example, a LAN (Local Area Network) can be used as the internal network 9.

The event notification system 1 has a processor, a memory, and a network controller (any of which is not shown). If an event is generated by any of the storage apparatus 2, the server device 3, and the relay device 4, the event notification system 1 receives the generated event, judges the content of the received event, and identifies a virtual volume to be affected by the generation of the event, for example, the virtual volume (VV0) 371, from among the plurality of virtual volumes 371.

If the service level is defined for the identified virtual volume 371 under the above-described circumstance, the event notification system 1 identifies, based on the received event, whether an incident in violation of the defined service level has occurred or not; and notifies, for example, the section A management system 61 of the identified content in accordance with the event filter information 121.

Furthermore, the event notification system 1 notifies the overall management system 71 of the content of the event received from the device and notifies the overall management system 71 of the event 92 associated with the information about the service level violation incident reported to the section A management system 61.

The storage apparatus 2 has a plurality of real volumes 26 and a controller (not shown) for controlling data input to, or output from, each real volume 26, as well as a storage event generator (not shown) for generating an event(s) if a failure occurs in any of the plurality of storage resources constituting the storage apparatus 2.

Each real volume 26 is composed of storage areas of one or more storage devices. For example, HDDs (Hard Disk Drives), semiconductor memory devices, optical disk devices, magneto-optical disk devices, magnetic tape devices, and flexible disk devices can be used as the storage devices.

If HDDs are used as the storage devices, for example, FC (Fibre Channel) disks, SCSI (Small Computer System Interface) disks, SATA (Serial ATA) disks, ATA (AT Attachment) disks, or SAS (Serial Attached SCSI) disks can be used.

Furthermore, each storage device can constitute a RAID (Redundant Array of Inexpensive Disks) group such as RAID4, RAID5, or RAID6 and each storage device can be divided into a plurality of RAID groups. Under this circumstance, a plurality of logical units (hereinafter sometimes referred to as LUs (Logical Units)) or a plurality of logical volumes can be formed in a physical storage area of each storage device.

The server device (SV0) 3 has a function sending/receiving information to/from the storage apparatus 2 via the relay device 4 and also has a function as a server event generator (not shown) for generating an event(s) if a failure occurs in any of a plurality of server resources constituting the server device 3. This server device 3 is equipped with the hypervisor 37 having a function as a virtualization device and a plurality of virtual servers (VM0, VM1) 38 operating on the hypervisor 37.

The hypervisor 37 virtualizes a plurality of real volumes 26, which are composed of storage areas of the storage devices (not shown) in the storage apparatus 2, to obtain a plurality of virtual volumes 371 which are composed of virtual storage areas; and manages the plurality of virtualized virtual volumes 371. Each virtual volume 371 is used by, for example, the plurality of virtual servers (VM0, VM1) 38 in order to store data.

The relay device 4 has a function relaying information or data sent and received between the server device 3 and the storage apparatus 2 and also has a function as a relay event generator (not shown) for generating an event(s) if a failure occurs in any of a plurality of relay resources constituting the relay device 4.

The resource management system 5 manages the plurality of storage resources (resources including physical resources and logical resources) constituting the storage apparatus 2, the plurality of server resources (resources including physical resources and logical resources) constituting the server device 3, and the plurality of relay resources (resources including physical resources and logical resources) constituting each relay device 4.

The section A management server device 6 is connected to the user terminal (not shown) used by the section A administrator 931 via the network 9 (or a network, which is not shown in the drawing, or the Internet) and has the section A management system 61 manage the virtual volumes 371 and the virtual server (VM0) 38 which are exclusively allocated to section A. Information managed by the section A management system 61 is provided to the user terminal used by the section A administrator 931 via the network 9, a network, which is not shown in the drawing, or the Internet. Incidentally, a group of logical resources such as the virtual volumes and the virtual server which are managed exclusively by section A will be hereinafter referred to as the domain #0.

The section B management server device 6 is connected to the user terminal (not shown) used by the section B administrator 932 via the network 9 (or a network, which is not shown in the drawing, or the Internet) and has the section B management system 61 manage the virtual volumes 371 and the virtual server (VM1) 38 which are exclusively allocated to section B. Information managed by the section B management system 61 is provided to the user terminal used by the section B administrator 932 via the network 9 or a network, which is not shown in the drawing, or the Internet. Incidentally, a group of logical resources such as the virtual volumes and the virtual server which are managed exclusively by section B will be hereinafter referred to as the domain #1.

The overall management server 7 has the overall management system 71 having a processor, a memory, and a network controller (any of which is not shown) manage the entire computer system. Under this circumstance, the system administrator 930 for managing the entire system can recognize information managed by the resource management system 5 and the content of events sent from the event notification system 1 by operating the overall management system 71, using the system administrator terminal (not shown).

Incidentally, the event notification system 1, the resource management system 5, and the overall management server 7 can be integrated and configured as an event management device.

Figure 3:
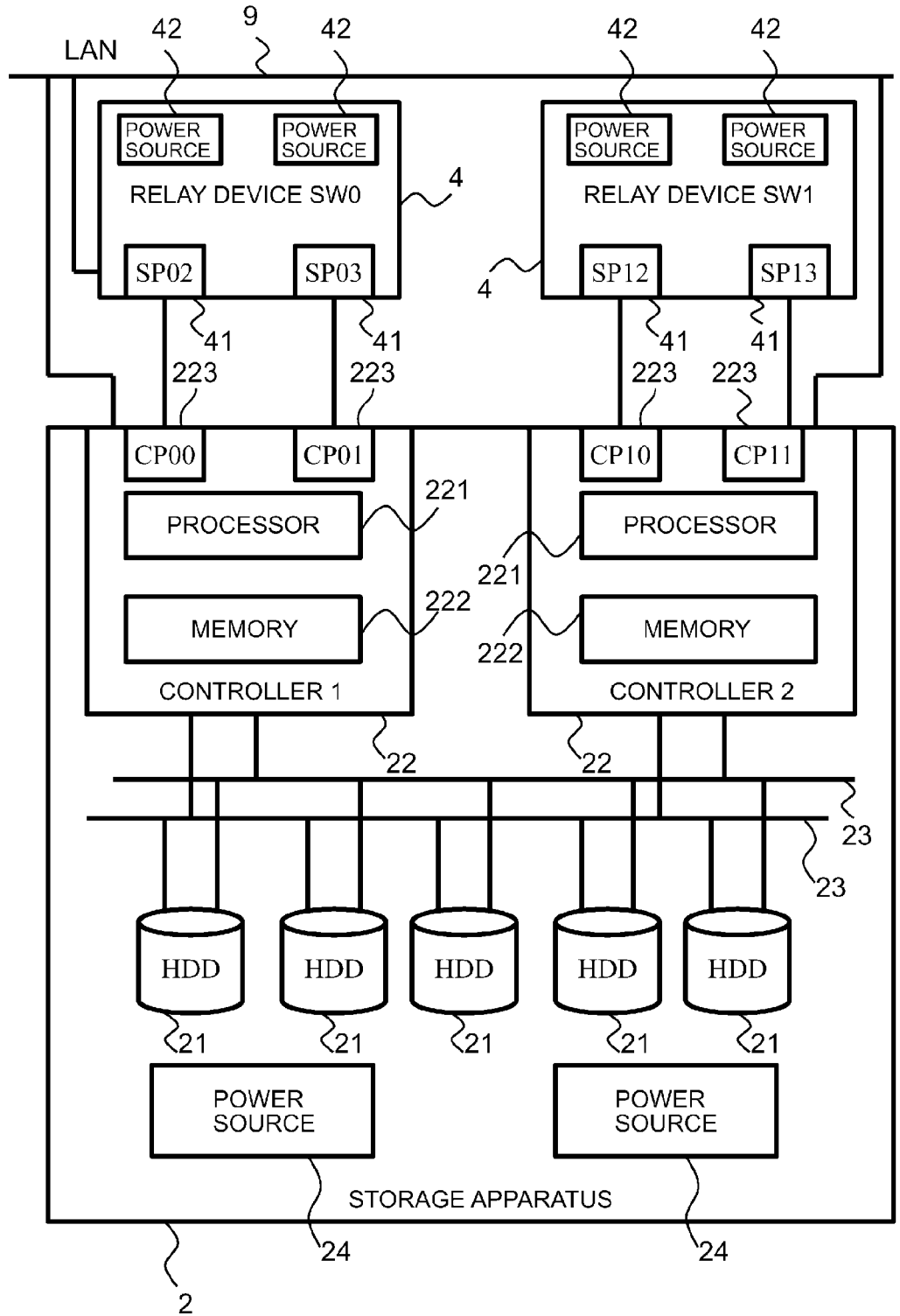
FIG. 3 is a block configuration diagram of a storage apparatus and relay devices.

Next, FIG. 3 shows a block configuration diagram of the relay devices and the storage apparatus.

Referring to FIG. 3, the relay device (SW0) 4 has a plurality of power sources 42 and a plurality of relay ports (SP02, SP03) 41 and the relay device (SW1) 4 has a plurality of power sources 42 and a plurality of relay ports (SP12, SP13) 41.

The storage apparatus 2 is constituted from a controller #1 22, a controller #2 22, a plurality of storage devices such as HDDs 21, and a plurality of power sources 24; and each controller 22 and each HDD 21 are connected via an internal bus 23.

The controller #1 22 is constituted from a processor 221 for supervising and controlling the entire controller 22, a memory 222 for storing, for example, control programs, and a plurality of controller ports (CP00, CP01) 223. The controller port (CP00) 223 is connected to the relay port (SP02) 41 and the controller port (CP01) 223 is connected to the relay port (SP03) 41.

The controller #2 22 is constituted from a processor 221 for supervising and controlling the entire controller 22, a memory 222 for storing, for example, control programs, and a plurality of controller ports (CP10, CP11) 223. The controller port (CP10) 223 is connected to the relay port (SP12) 41 and the controller port (CP11) 223 is connected to the relay port (SP13) 41.

Figure 4:
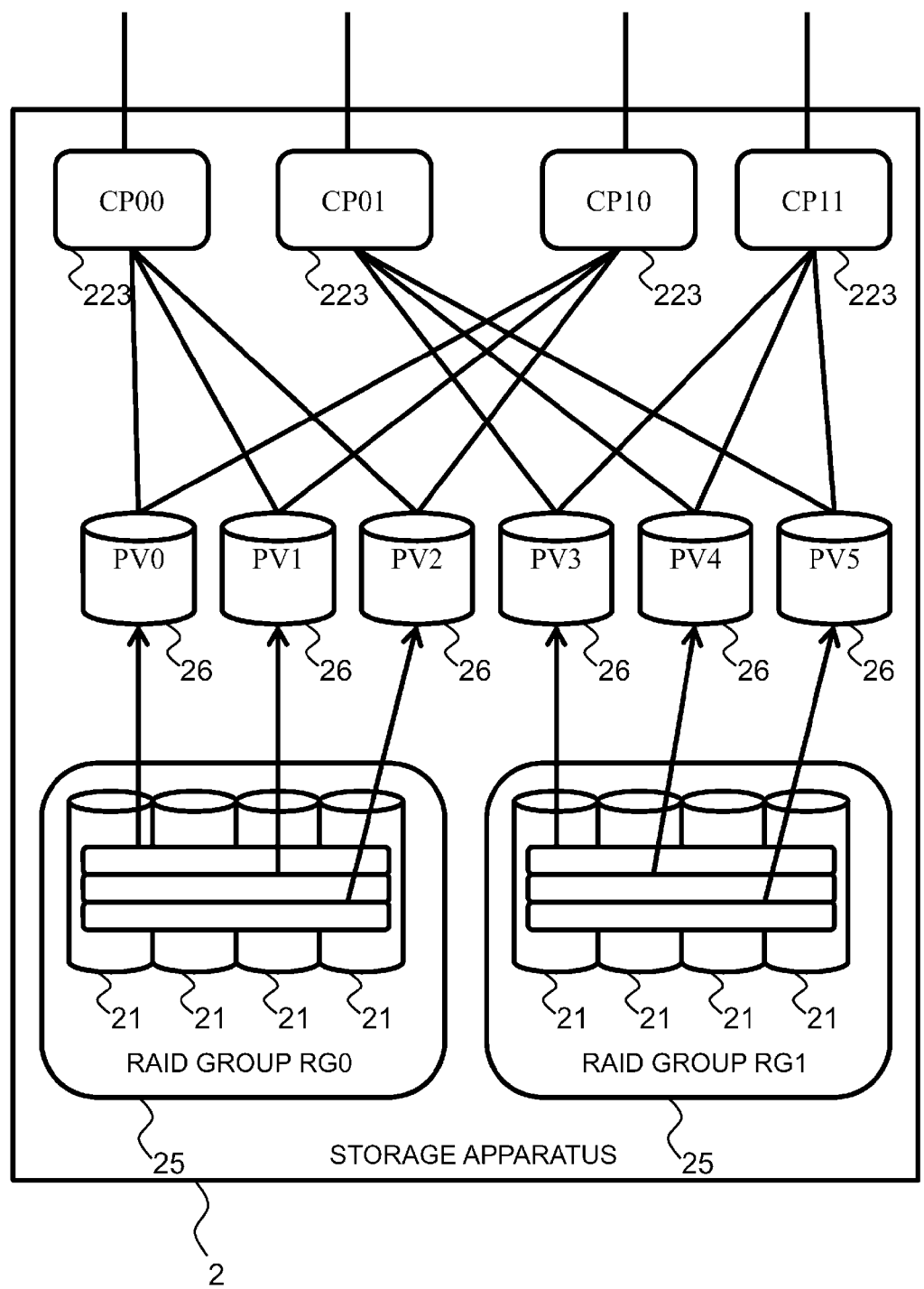
FIG. 4 is a logical configuration diagram of the storage apparatus.

FIG. 4 shows a logical configuration diagram of the storage apparatus.

When RAID groups are composed of a plurality of HDDs 21 in FIG. 4, for example, a RAID group #0 (RG1) 25 is composed of a plurality of HDDs 21 and a RAID group #1 (RG1) 25 is composed of plurality of HDDs 21.

A plurality of real volumes (PV0, PV1, PV2) 26 are composed of storage areas of the plurality of HDDs 21 constituting the RAID group #0 25. A plurality of real volumes (PV3, PV4, PV5) 26 are composed of storage areas of the plurality of HDDs 21 constituting the RAID group #1 25.

The real volumes (PV0, PV1, PV2) 26 are configured so that they can be accessed from the server device 3 via the controller ports (CP00, CP10) 223; and the real volumes (PV3, PV4, PV5) 26 are configured so that they can be accessed from the server device 3 via the controller ports (CP10, CP11) 223.

Figure 5:
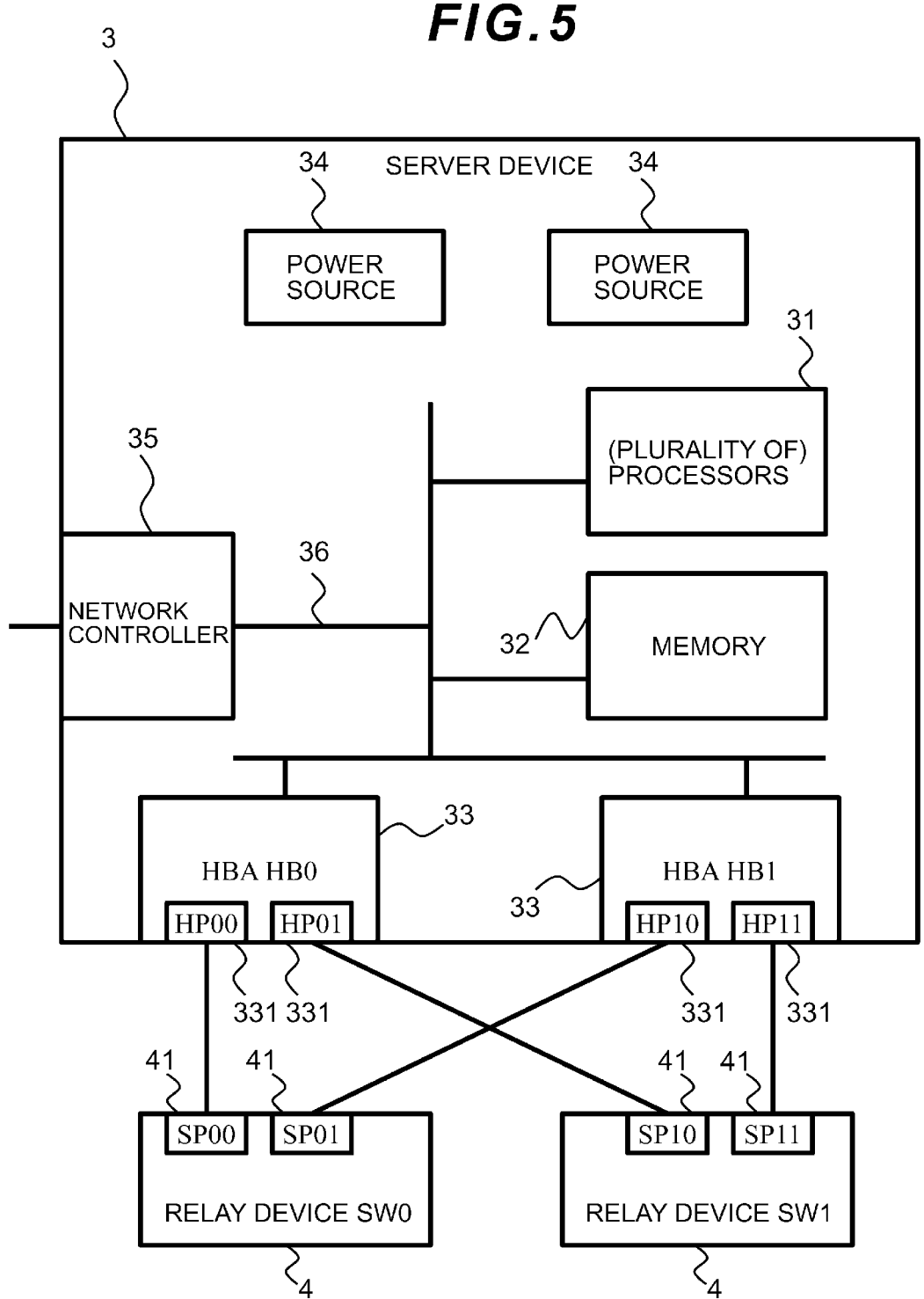
FIG. 5 is a block configuration diagram of a server device.

FIG. 5 shows a physical configuration diagram of the server device.

Referring to FIG. 5, the server device 3 has a plurality of physical resources including a plurality of processors 31 for supervising and controlling the entire server device 3, a memory 32 for storing various programs and information, host bus adapters (HB0, HB1) 33 for sending/receiving data to/from each relay device 4, a plurality of power sources 34, and a network controller 35; and the respective elements are connected via an internal network 36.

The host bus adapter #0 33 has a plurality of host ports (HP00, HP01) 331. The host port (HP00) 331 is connected to the relay port (SP00) 41 of the relay device (SW0) 4, and the host port (HP01) 331 is connected to the relay port (SP10) 41 of the relay device (SW1) 4.

The host bus adapter #1 33 has a plurality of host ports (HP10, HP11) 331. The host port (HP10) 331 is connected to the relay port (SP01) 41 of the relay device (SW0) 4, and the host port (HP11) 331 is connected to the relay port (SP11) 41 of the relay device (SW1) 4.

Figure 6:
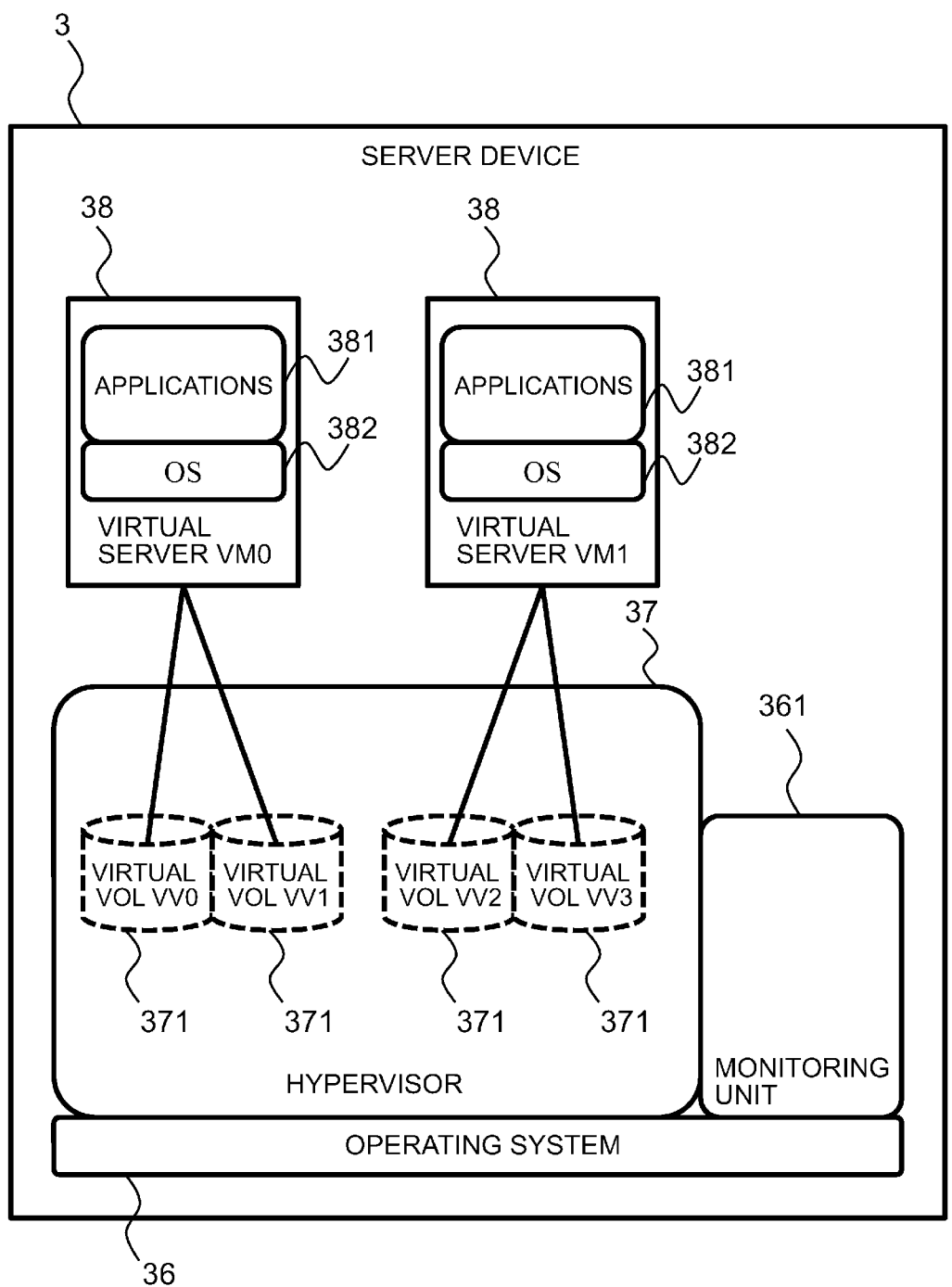
FIG. 6 is a logical configuration diagram of the server device.

Next, FIG. 6 shows a logical configuration diagram of the server device.

Referring to FIG. 6, the server device 4 includes an operating system (OS) 36, a hypervisor 37, a virtual server #0 38, and a virtual server #1 38.

The hypervisor 37 operates on the operating system 36 and also a monitoring unit 361 for monitoring whether a failure exists or not in each of the physical resources constituting the hypervisor 37 and the server device 3 operates on the operating system 36. This monitoring unit 361 functions as a server event generator for generating an event when a failure occurs in the hypervisor 37 or a failure occurs in the various physical resources. Incidentally, the hypervisor 37 itself can have a function equivalent to that of the monitoring unit 361. Furthermore, hardware independent of the operating system 36 can be equipped with a function monitoring the physical resources and a failure notice function.

The hypervisor 37 configures virtual volumes #0 to #3 (VV0, VV1, VV2, VV3) 371 as virtual volumes obtained by virtualizing the real volumes 26.

The virtual server #0 (VM0) 38 has applications 381 and an OS (operating system) 382 and activates the applications 381 operating on the OS 382. Also, the virtual server #0 (VM0) 38 is configured so that it can access the virtual volumes #0, #1 (VV0, VV1) 371; and these virtual volumes are used by the applications 381 on the virtual server (VV0) to store data.

The virtual server #1 (VM1) 38 has applications 381 and an OS (operating system) 382 and activates the applications 381 operating on the OS 382. Also, the virtual server #1 (VM1) 38 is configured so that it can access the virtual volumes #2, #3 (VV2, VV3) 371; and these virtual volumes are used by the applications 381 on the virtual server (VV1) to store data.

Figure 7:
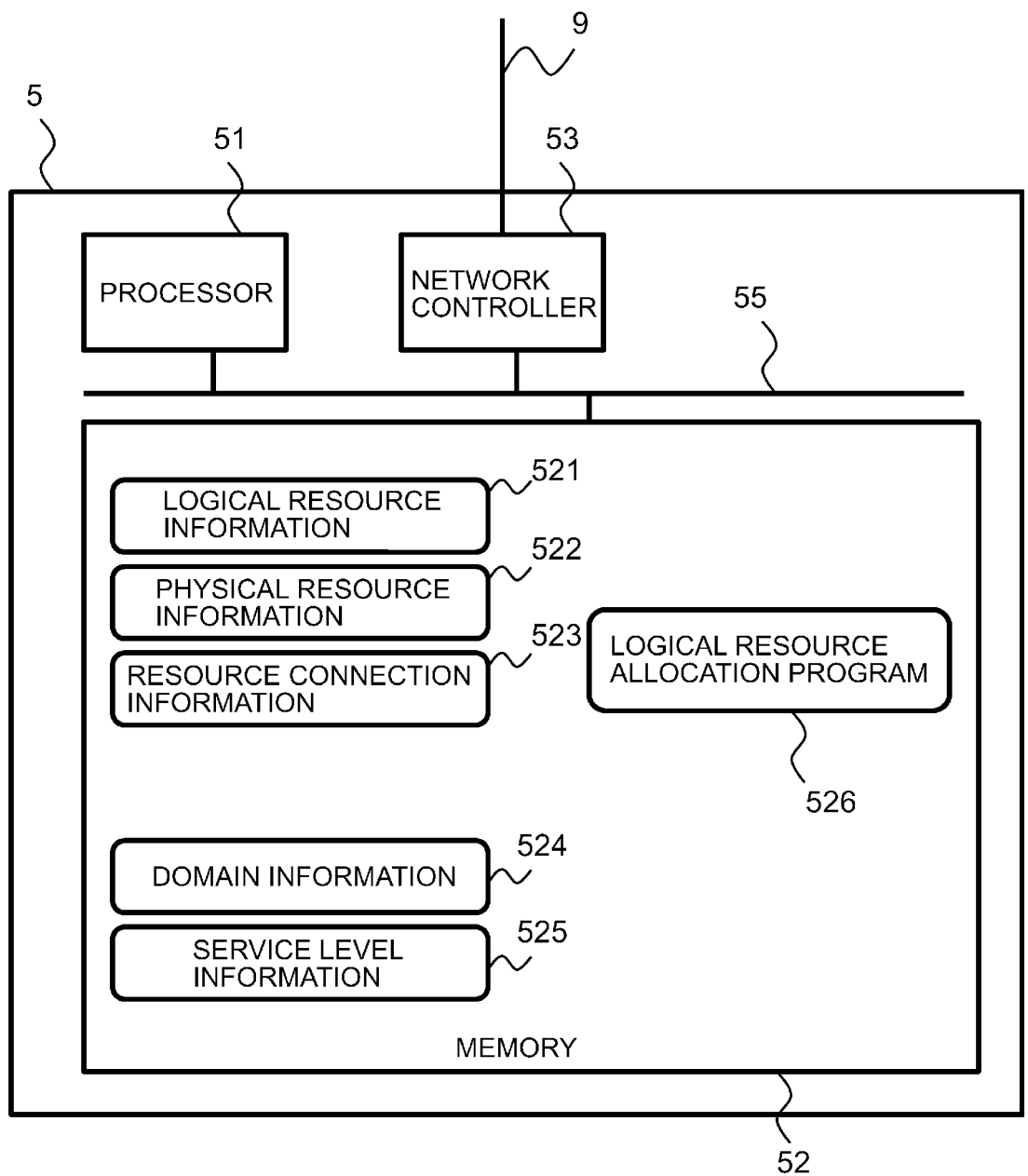
FIG. 7 is a block configuration diagram of a resource management system.

Next, FIG. 7 shows a block configuration diagram of the resource management system.

Referring to FIG. 7, the resource management system 5 has a processor 51 for supervising and controlling the entire resource management system 5, a memory 52 for storing various information and programs, and a network controller 53 for controlling, for example, data transferred over the network 9 and the respective elements are connected via an internal bus 55. The memory 52 stores logical resource information 521, physical resource information 522, resource connection information 523, domain information 524, service level information 525, and a logical resource allocation program 526.

Figure 8:
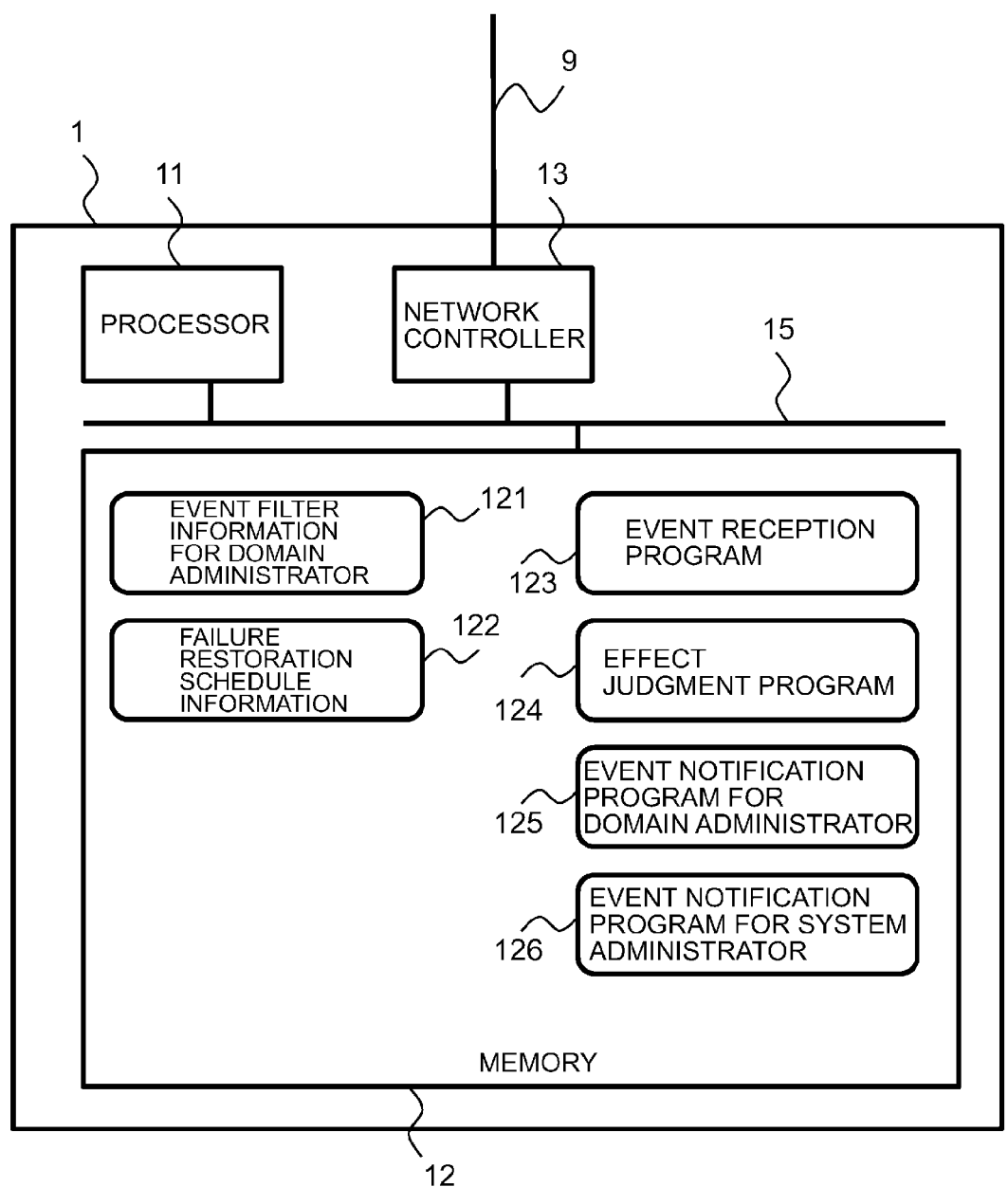
FIG. 8 is a block configuration diagram of an event notification system.

Next, FIG. 8 shows a block configuration diagram of the event notification system.

Referring to FIG. 8, the event notification system 1 has a processor 11 for supervising and controlling the entire event notification system, a memory 12 for storing various information and programs, and a network controller 13 for controlling, for example, data transferred over the network 9 and the respective elements are connected via an internal bus 15.

The memory 12 stores event filter information (a domain administrator) 121, failure restoration schedule information 122, an event reception program 123, an effect judgment program 124, an event notification program (for the domain administrator) 125, and an event notification program (for the system administrator) 126.

Next, FIG. 9 shows a configuration diagram of the logical resource information.

Referring to FIG. 9, the logical resource information 521 is information for managing a plurality of logical resources constituting the storage apparatus 2 or the server device 3 and is constituted from an ID field 521A, a type field 521B, a subordinate resource ID field 521C, and a domain ID field 521D.

The ID (IDentifier) is information about an identifier for uniquely identifying each logical resource. Each entry of this ID field 521A stores: PV0 to PV5 when identifying a real volume 26; and VV0 to VV3 when identifying a virtual volume 371. Furthermore, each entry of the ID field 521A stores: RG0 or RG1 when identifying a RAID group; and VM1 or VM2 when identifying a virtual server 38.

The type is information about a name for identifying the type of each logical resource. Each entry of the type field 521B stores: REAL VOLUME when the relevant logical resource is a real volume 26; VIRTUAL VOLUME when the relevant logical resource is a virtual volume 371; RAID GROUP when the relevant logical resource is a RAID group; or VIRTUAL SERVER when the relevant logical resource is a virtual server 38.

The subordinate resource ID is an identifier for identifying a resource located at a subordinate position of the logical resource with the relevant ID. Each entry of the subordinate resource ID field 521C stores the identifier for identifying the relevant subordinate resource.

For example, if the real volume 26 is composed of the RG (RAID group) #0, an entry corresponding to the real volume 26 composed of the RG (RAID group) #0 stores RG0. Furthermore, if the virtual volume 371 is composed of a plurality of real volumes PV0, PV1, an entry corresponding to this virtual volume 371 stores PV0, PV1. In a case of a real volume, a virtual volume, or a RAID group, information about its maximum capacity may be further stored in a maximum capacity field (not shown in the drawing). Also, in a case of the real volume, a total value of the capacity allocated to the virtual volume may be further stored in an allocated capacity field (not shown in the drawing).

The domain ID is an identifier for identifying the relevant domain. An entry of the domain ID field 521D stores DM0 or DM1 as the identifier of the relevant domain. DM0 is the identifier of the domain #0 and DM1 is the identifier of the domain #1.

Next, FIG. 10 shows a configuration diagram of the physical resource information.

Referring to FIG. 10, the physical resource information 522 is information for managing a plurality of physical resources constituting the storage apparatus 2 or the server device 3 and is constituted from an ID field 522A, a type field 522B, a superior resource ID field 522C, and a status field 522D.

The ID is information about an identifier for uniquely identifying each physical resource. Each entry of the ID field 522A stores: ST0 when identifying the storage apparatus 2; HD0 to HD7 when identifying the HDD 21; and CT0 or CT1 when identifying the controller 22. Furthermore, each entry of the ID field 522A stores: CP00 to CP11 when identifying the controller port 223; and PS00 or PS01 when identifying the power source 34. Furthermore, Each entry of the ID field 522A stores: the identifier SV0 when identifying the server device 3; HB0 or HB1 when identifying the HBA 33; and HP00, HP01, HP10, HP11 when identifying the host port 331.

The type is information about a name for identifying the type of each physical resource. Each entry of the type field 522B stores: STORAGE APPARATUS in a case of the storage apparatus 2; HDD in a case of the HDD 21; CONTROLLER in a case of the controller 22; CONTROLLER PORT in a case of the controller port 223; and POWER SOURCE in a case of the power source 34. Furthermore, each entry of the type field 522B stores: SERVER DEVICE in a case of the server device 3; HBA in a case of the HBA 33; and HOST PORT in a case of the host port 331.

The superior resource ID is information about an identifier for identifying a resource located at a superior position of each physical resource.

From among entries of the superior resource ID field 522C, for example, an entry corresponding to the HDD 21 stores ST0 when the superior resource of the HDD 21 is the storage apparatus 2; and an entry corresponding to the controller 22 stores ST0 when the superior resource of the controller 22 is the storage apparatus 2. Furthermore, an entry corresponding to the controller port 223 stores CT0 or CT1 when the superior resource of the controller port 223 is the controller 22.

The status is information about the status of each physical resource. Each entry of the status field 522D stores: information indicating NORMAL when the relevant physical resource is in a normal state; and information indicating FAILURE when a failure has occurred in the relevant physical resource.

Figure 11:
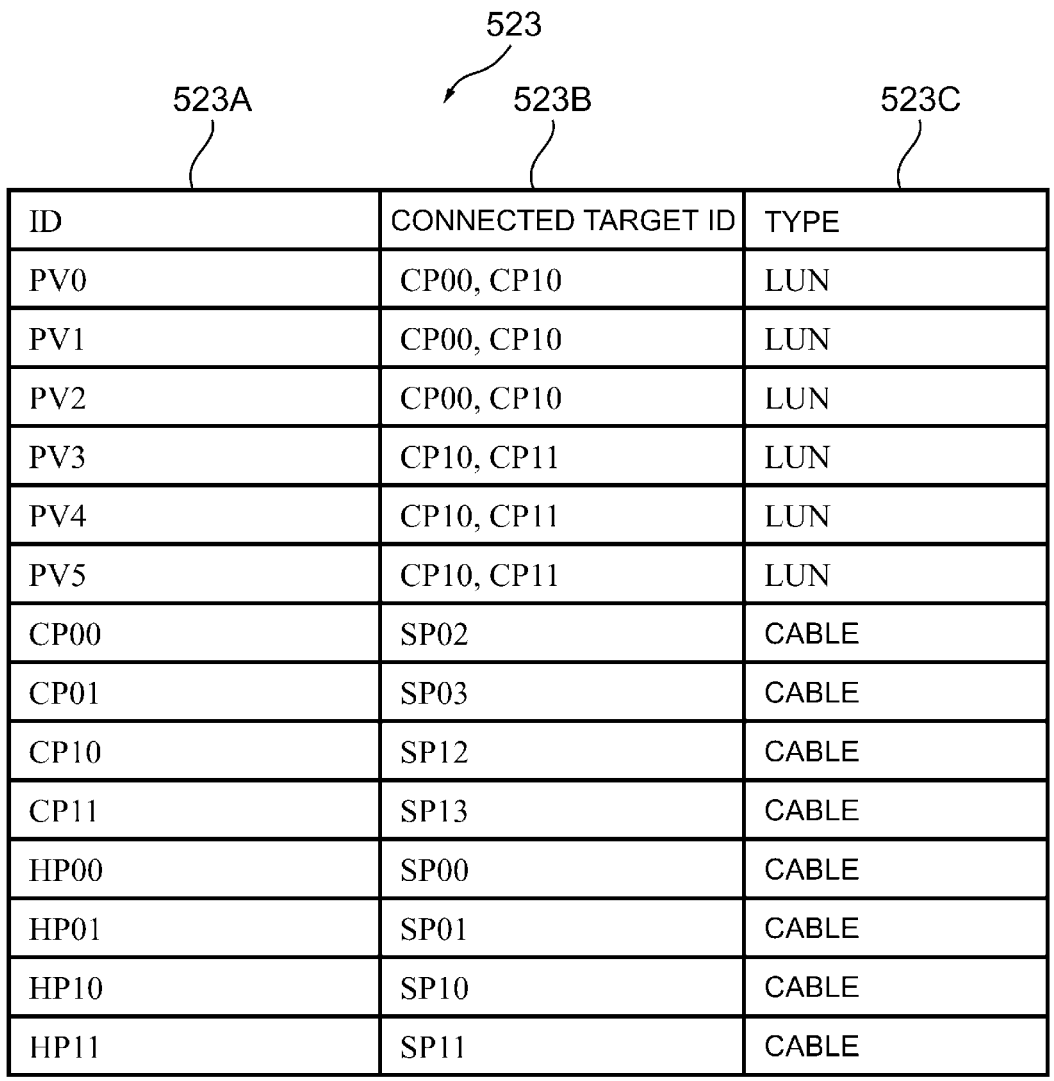
FIG. 11 is a configuration diagram of resource connection information.

Next, FIG. 11 shows a configuration diagram of the resource connection information.

Referring to FIG. 11, the resource connection information 523 is information for managing a connection relationship between a plurality of resources and is constituted from an ID field 523A, a connected target ID field 523B, and a type field 523C.

The ID is information about an identifier for uniquely identifying each resource. An entry of the ID field 523A stores: PV0 to PV5 when identifying the real volume 26; CP00 to CP11 when identifying the controller port 223; and HP00 to HP11 when identifying the host port of the host bus adapter 33.

The connected target ID is information about an identifier for uniquely identifying a connected target of each resource. An entry of the connected target ID field 523B stores an identifier for identifying the connected target of each resource. For example, if the connected targets of the real volume PV0 26, from among the real volumes 26, are the controller ports (CP00, CP10) 223, the connected target ID field 523B stores CP00, CP10.

The type is information about the type of connections between the resources. An entry of the type field 523C stores, for example: LUN when the real volume 26 is configured so that it can be accessed from the controller port 223; and CABLE when the controller port 223 is connected to the relay port 41.

Figure 12:
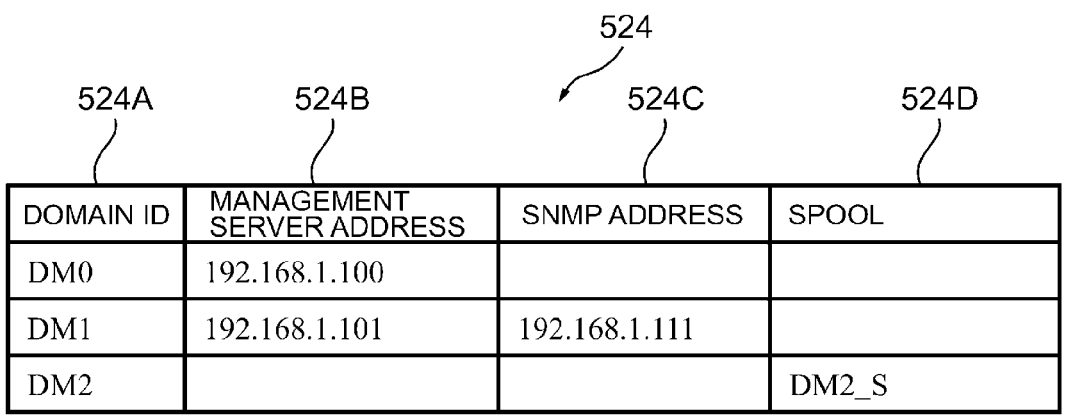
FIG. 12 is a configuration diagram of domain information.

Next, FIG. 12 shows a configuration diagram of the domain information.

Referring to FIG. 12, the domain information 524 is information for managing the section A management system 61 and the section B management system 61 and is constituted from a domain ID field 524A, a management server address field 524B, an SNMP address field 524C, and a spool field 524D.

The domain ID is information about an identifier for uniquely identifying the relevant domain. An entry of the domain ID field 524A stores, for example: DM0 as the domain ID corresponding to the domain #0 of section A; or DM1 as the domain ID corresponding to the domain #1 of section B.

The management server address is an address allocated to the section A management server device 6 or the section B management server device 6. An entry of the management server address field 524B stores 192.168.1.100 as an address corresponding to the section A management server device 6 or 192.168.1.101 as an address corresponding to the section B management server device 6.

The SNMP address is an address used for event notification using an SNMP trap. An entry corresponding to the section B management server device 6, from among entries of the SNMP address field 524C, stores 192.168.1.111.

If a plurality of domains are managed by one management system, a spool (event spool) is provided in the management system and events specific to a domain are stored in the spool. The administrator of that domain can refer to the events stored in the spool. An entry corresponding to the domain ID DM2, from among entries of the spool field 524D, stores DM2_S as the name for identifying the spool. This indicates that events addressed to the domain corresponding to the domain ID DM2 are stored in the spool DM2_S provided in the common management system.

Figure 13:
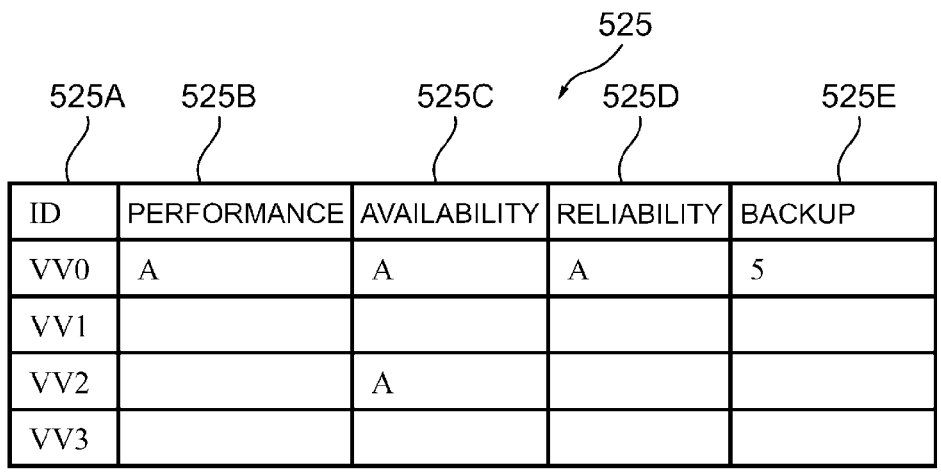
FIG. 13 is a configuration diagram of service level information.

Next, FIG. 13 shows a configuration diagram of the service level information.

Referring to FIG. 13, the service level information 525 is information about the service level defined as the SLA and is constituted from an ID field 525A, a performance field 525B, an availability field 525C, a reliability field 525D, and a backup field 525E.

The ID is information about an identifier for uniquely identifying each virtual volume 371. Each entry of the ID field 525A stores, for example, VV0 to VV3 as the identifier for identifying the relevant virtual volume 371.

The performance is information about performance required for each virtual volume 371. An entry of the performance field 525B stores: information indicating A when the service level is high; information indicating B when the service level is medium; and information indicating C when the service level is low. A blank means that no service level is defined.

The availability is information about availability of the virtual volume 371. Each entry of the availability field 525C stores: information indicating A when the service level relating the availability of the virtual volume 371 is high; information indicating B when the service level relating the availability of the virtual volume 371 is medium; and information indicating C when the service level is low. A blank means that no service level is defined.

The reliability is information about reliability of the virtual volume 371. An entry of the reliability field 525D stores: A when the service level relating the reliability of the virtual volume 371 is high; information indicating B when the service level relating the reliability of the virtual volume 371 is medium; and information indicating C when the service level is low. A blank means that no service level is defined.

The backup is information about the required number of the virtual volumes 371 when backing up the relevant virtual volume 371. An entry of the backup field 525E stores information indicating the number of the virtual volumes 371 required for a backup. For example, if five virtual volumes 371 are required to back up the relevant virtual volume 371, information indicating 5 is stored in the backup field 525E.

Figure 14:
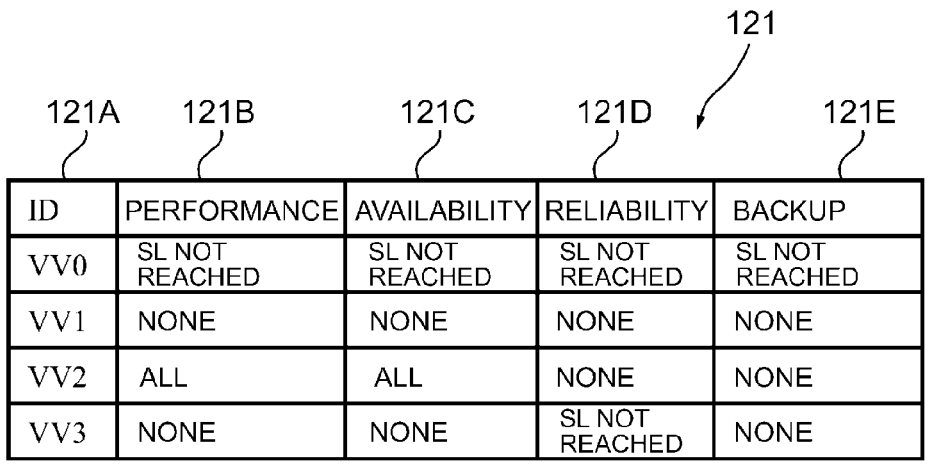
FIG. 14 is a configuration diagram of event filter information.

Next, FIG. 14 shows a configuration diagram of the event filter information.

If an incident in violation of the service level occurs, the event filter information 121 shown in FIG. 14 is information for managing an event notification method for reporting that incident and is constituted from an ID field 121A, a performance field 121B, an availability field 121C, a reliability field 121D, and a backup field 121E.

An entry of the ID field 121A stores, for example, VV0 to VV3 as an identifier for identifying the relevant virtual volume 371.

The performance is information for defining the event notification method in a case of a violation of the service level with respect to the performance of each virtual volume 371. The availability is information for defining the event notification method in a case of a violation of the service level with respect to the availability of the virtual volume 371. The reliability is information for defining the event notification method in a case of a violation of the service level with respect to the reliability of the virtual volume 371. The backup is information for defining the event notification method in a case of a violation of the service level with respect to the backup of the virtual volume 371.

If the content of the event does not reach the service level defined by the service level information 525 in FIG. 13, each entry of the performance field 121B, the availability field 121C, the reliability field 121D, and the backup field 121E stores information indicating SL NOT REACHED (first filter information) which means that the content of the event will be reported.

On the other hand, if it is unnecessary to report the service level violation regardless of whether or not the service level is defined, each entry of the performance field 121B to the backup field 121E stores information indicating NONE. Furthermore, if a violation of the service level occurs, each entry of the performance field 121B to the backup field 121E stores information indicating ALL (second filter information) when notice should be always made.

Figure 15:
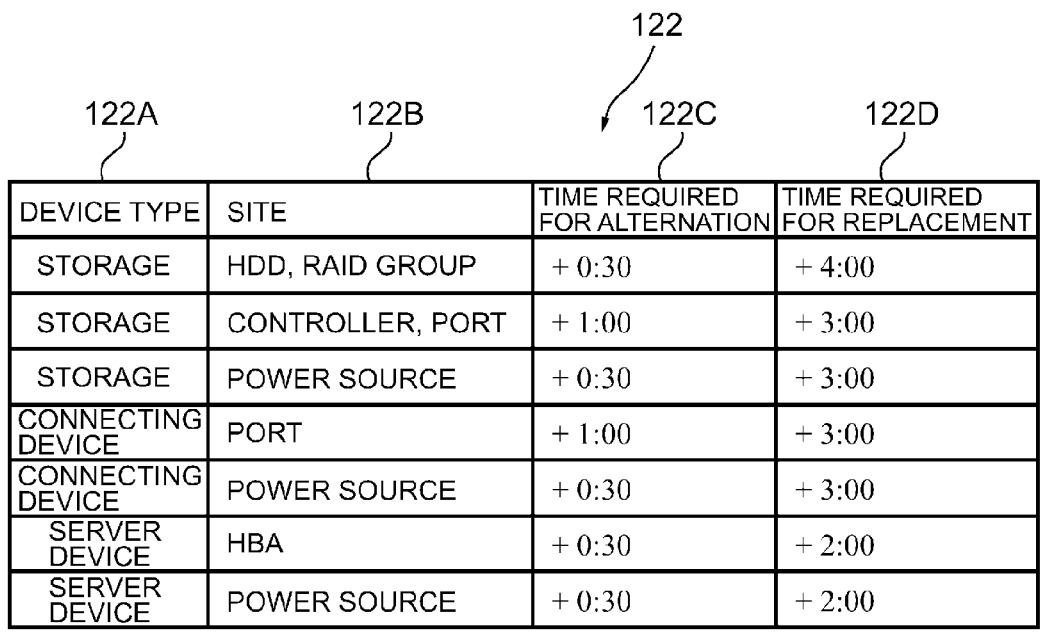
FIG. 15 is a configuration diagram of failure restoration schedule information.

Next, FIG. 15 shows a configuration diagram of the failure restoration schedule information.

Referring to FIG. 15, the failure restoration schedule information 122 is information for retaining time required for failure restoration of each type of the resources and is constituted from a device type field 122A, a site field 122B, a time-required-for-alternation field 122C, and a time-required-for-replacement field 122D.

An entry of the device type field 122A stores information about the device type. For example, an entry of the device type field 122A stores: information indicating STORAGE in a case of the storage apparatus; information indicating CONNECTING DEVICE in a case of the relay device; and information indicating SERVER DEVICE in a case of the server device.

An entry of the site field 122B stores information indicating the type of a failure occurrence site in the device of the type shown in the device type field 122A. For example, in a case of the storage apparatus, an entry of the site field 1228 stores HDD and RAID GROUP with respect a RAID group and HDD.

The time required for alternation is information about the maximum required time to switch the processing to another system when the failure site indicated by the site field 122B is a redundant configuration. An entry of the time-required-for-alternation field 122C stores information indicating, for example, +0:30 when a maximum of 30 minutes are required as the time required for alternation.

The time required for replacement is information required to restore the failure site indicated by the site field 122B by means of, for example, replacement of the site. An entry of the time-required-for-replacement field 122A stores information about maximum required time to restore the failure occurrence site. For example, an entry of the time-required-for-replacement field 122A stores information indicating +4:00 when a maximum of four hours are required to restore the HDD or the RAID group in the storage apparatus.

FIG. 16 shows a display example of a logical resource allocation screen.

Referring to FIG. 16, a logical resource allocation screen 81 is a screen displayed on a display screen of the user terminal. A section administrator can create a desired virtual volume by using this screen. An area 810 for creating a virtual volume 371 displays a user ID and a domain. The user ID is a user ID of a section system administrator who operates this screen. The domain is a domain ID of a domain recognized as a management target by the section system administrator who operates this screen. These pieces of information have been already input as authentication information by the section system administrator on a previous screen before this screen is displayed. An area for basic settings is displayed below the above-described area. The capacity of the virtual volume 371 used by the user is input in a capacity input area 811 as operated by the section system administrator (hereinafter referred to as the user).

A service level display area 812 displays performance, availability, reliability, and backup as service level items. Areas A, B, C, and NONE for selecting the service level of each item are displayed in the order of high, medium, and low corresponding to the performance, availability, and reliability items. Areas 1, 5, 10, and NONE for selecting the number of the virtual volumes 371 required for a backup are displayed corresponding to the backup item.

Furthermore, the ID of a virtual server 38 to which the created virtual volume 371 is to be allocated is input to a virtual server input area 813 for selecting the virtual server as operated by the user.

Selection items for performance, availability, reliability, and backup are displayed in a notification condition selection area 814 in event notice settings. The user can select either Case Where All Applies or Service Level Violation, or can select neither of them with respect to each of these selection items. Furthermore, if either of them is selected, the user may further select either one of Only One Hour or Longer Restoration Time or Only One Day or Longer Restoration Time, or can select neither of them.

Now, if the user selects Case Where All Applies with respect to any of the items, this content will be reflected as ALL in the event filter information 121 in FIG. 14. Moreover, if the user selects Service Level Violation with respect to any of the items, this content will be reflected as SL NOT REACHED in the event filter information 121 in FIG. 14. Furthermore, if the user selects Only One Hour or Longer Restoration Time, one hour or longer restoration time, in addition to ALL and SL NOT REACHED, will be added as the third filter information to the event filter information 121. The same applies to the case of Only One Day or Longer Restoration Time.

Figure 17:
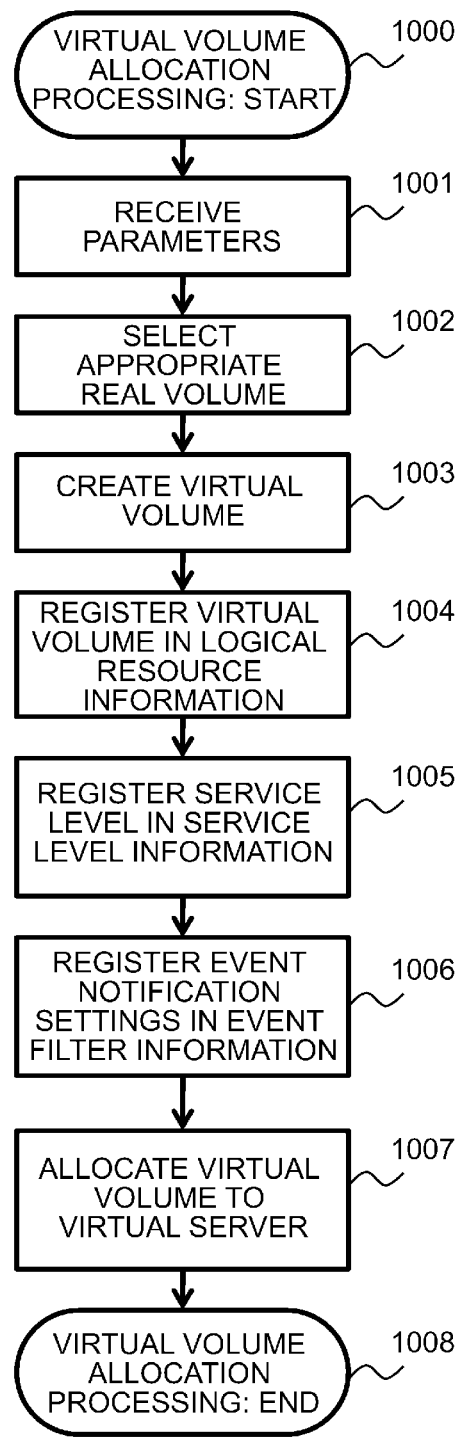
FIG. 17 is a flowchart explaining processing by a logical resource allocation program.

Next, the content of processing by the logical resource allocation program will be explained with reference to a flowchart in FIG. 17.

The logical resource allocation program 526 is activated by the processor 51 for the resource management system 5.

Firstly, when the logical resource allocation program 526 is activated by the processor 51 for the resource management system 5, it starts virtual volume allocation processing (step 1000), receives parameters input to the logical resource allocation screen 81 in FIG. 16, such as the required capacity of a virtual volume 371 and the ID of the virtual server 38 (step 1001), selects an appropriate real volume 26 to create a virtual volume 371 with the capacity required by the user (step 1002), and virtualizes the selected real volume 26 and creates the virtual volume 371 (step 1003). The real volume 26 with an appropriate unused capacity can be selected by using the logical resource information 521. The virtual volume 371 can be composed of a plurality of real volumes 265. An appropriate ID which does not overlap with any existing resource ID is set to the created virtual volume 371.

Next, the logical resource allocation program 526 registers the created virtual volume 371, together with the ID of the domain managed by the user, in the logical resource information 521 (step 1004); registers each item of the service level, which has been input, in the service level information 525 (step 1005); registers the content of the selection area 814 (the content selected by the user), from among the event notice settings, in the event filter information 121 (step 1006); sets (allocates) the created virtual volume 371 so that it can be accessed from the virtual server 38 with the ID which has been input to the virtual server input area 813 (step 1007); and terminates the processing in this routine (step 1008). The creation of the virtual volume 371 and the allocation of the virtual volume 371 to the virtual server 38 can be executed by controlling the hypervisor 37 via the network 9.

Next, the processing content of the event reception program 123 will be explained with reference to a flowchart in FIG. 18.

The event reception program 123 is activated by the processor 11 for the event notification system 1.

After the event reception program 123 is activated by the processor 11, it starts event reception processing (step 1100), executes event wait processing (step 1101), judges whether it has received an event or not (step 1102), and repeats the processing in step 1101 and step 1102 until it receives an event.

When receiving an event, the event reception program 123 judges whether the event is a storage event or not (step 1104).

If an affirmative judgment is returned in step 1104, that is, if the event reception program 123 has received the event from the storage apparatus 2, the event reception program 123 executes storage effect judgment processing (step 1105); and if a negative judgment is returned in step 1104, the event reception program 123 judges whether the relevant event is a connecting device event or not (step 1106).

If an affirmative judgment is returned in step 1106, that is, if the event reception program 123 has received the event from the relay device 4 which is the connecting device, the event reception program 123 executes connecting-device effect judgment processing (step 1107); and if a negative judgment is returned in step 1106, the event reception program 123 judges whether the relevant event is a server device event or not (step 1108).

If an affirmative judgment is returned in step 1108, that is, if the event reception program 123 has received the event from the server device 3, the event reception program 123 executes server-device effect judgment processing (step 1109).

At the end of the above-described processing, the event reception program 123 executes system administrator notification processing (step 1110) and domain administrator notification processing (step 1111) and returns to the processing in step 1101. In step 1110, the event reception program 123 activates the event notification program (for the system administrator) 126 to send, to the overall management system 71, information about the effects on the resources allocated to each section (the service level violation incident), which were judged in step 1105, 1107, 1109 in association with the event information received from the device. In step 1111, the event reception program 123 activates the event notification program (for the domain administrator) 125 and sends the effects on the resources allocated to each section, to the section management system 61 for managing the domain to which the resources are allocated.

Next, the content of the storage effect judgment processing will be explained with reference to flowcharts in FIG. 19 to FIG. 21. Incidentally, the processor 11 forms, in the memory 12, a template for the section event information to be reported to the section management system 61 before executing the above-mentioned processing. This template for the section event information will be eventually sent, as information about the effects on the resources allocated to each section, by the event notification program (for the domain administrator) 125 (which is activated in step 1111 in FIG. 18) to the section management system 61. Furthermore, the effect judgment program 124 communicates with the logical resource allocation program 526 via the network 9 so that the logical resource information 521, the physical resource information 522, the resource connection information 523, the domain information 524, and the service level information 525 can be accessed.

Figure 18:
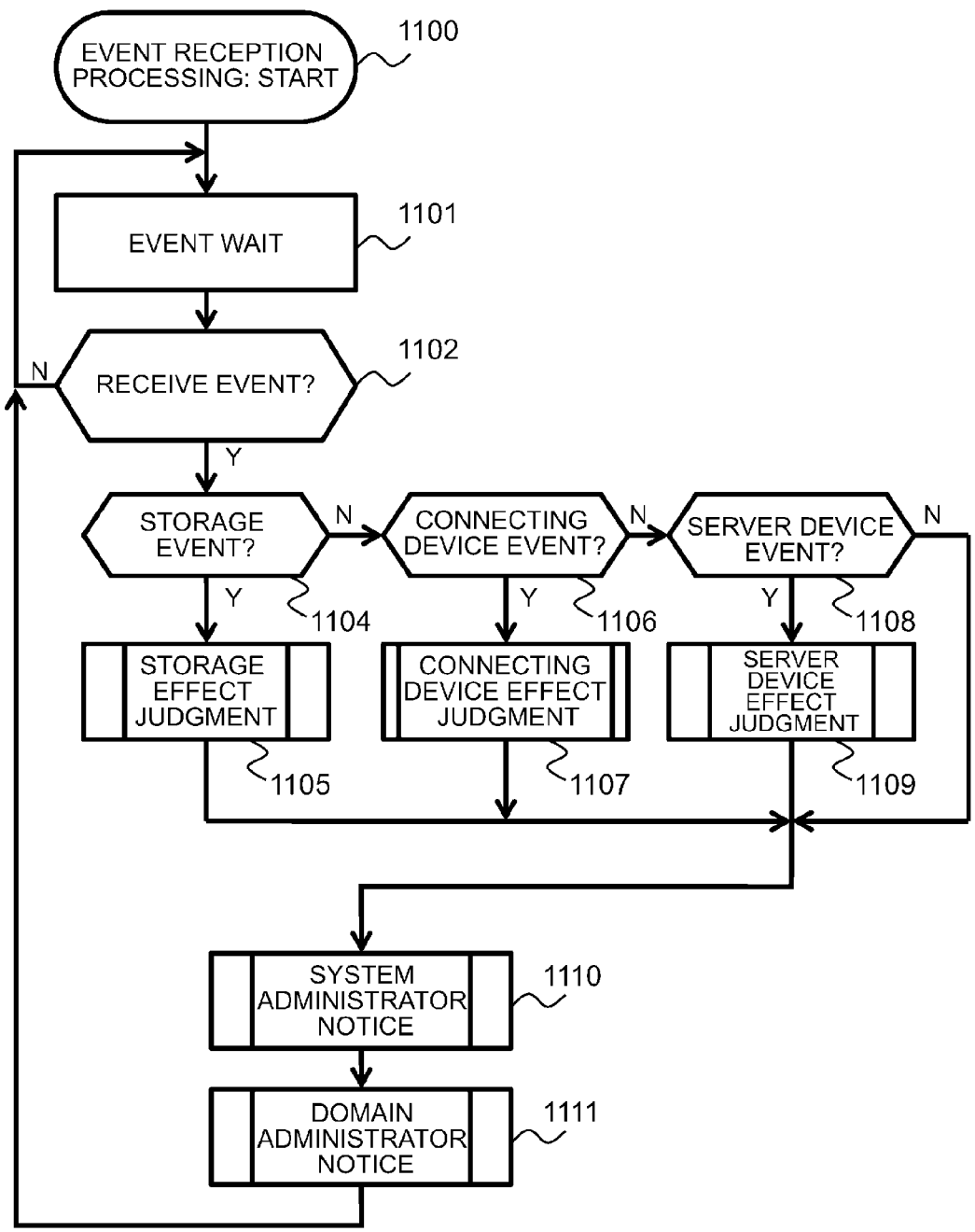
FIG. 18 is a flowchart explaining processing by an event reception program.

If an affirmative judgment is returned in step 1104 in FIG. 18, the effect judgment program 124 starts the storage effect judgment processing (step 1200).

The effect judgment program 124 judges the content of the received event and judges whether or not the received event is an event of the HDD 21 or the RAID group 25 (step 1201). If a negative judgment is returned in step 1201, the effect judgment program 124 proceeds to processing in step 1212; and if an affirmative judgment is returned in step 1201, the effect judgment program 124 identifies the virtual volume 371 and the domain, to which that virtual volume 371 is allocated, based on the content of the received event and the logical resource information 521 (steps 1202 and 1203) and judges, based on the content of the received event, whether the relevant event is degeneration of the RAID group or not (step 1204).

If a negative judgment is returned in step 1204, the effect judgment program 124 proceeds to processing in step 1208; and if an affirmative judgment is returned in step 1204, the effect judgment program 124 executes processing for adding reliability degradation information to the template for the section event information (step 1205) and judges whether the relevant event is the RAID group reconstruction or high load (step 1206). Incidentally, the reliability degradation information herein used includes the identifier (ID) of the virtual volume 37 which is a target, information which indicates the occurred incident such as reliability degradation, and the overview of a cause for the reliability degradation. The overview of the cause is, for example, information meaning Storage Failure Requiring Device Replacement and does not include any detained information such as a specific location of the failure. Furthermore, all of reliability degradation information, availability degradation information, and performance degradation information, which are to be added to the template for the section event information below, includes the identifier (ID) of the target virtual volume 37, the information indicating the occurred incident as identified by the judgment processing, and the information indicating the overview of the cause in the same manner as in the example described in this paragraph. A template for the section event information for one section may sometimes include identifiers of a plurality of virtual volumes 371, and the information indicating the occurred incident and the information indicating the overview of the cause are associated with the virtual volumes 371. Furthermore, the template for the section event information includes failure occurrence time included in the event information received from various devices.

If a negative judgment is returned in step 1206, the effect judgment program 124 proceeds to processing in step 1208; and if an affirmative judgment is returned in step 1204, the effect judgment program 124 executes processing for adding the performance degradation information to the template for the section event information (step 1207) and judges, based on the content of the received event, whether a fault has occurred in the RAID group or not (step 1208).

If a negative judgment is returned in step 1208, the effect judgment program 124 proceeds to processing in step 1210; and if an affirmative judgment is returned in step 1208, for example, if the HDDs 21 cannot be accessed due to the fault of the RAID group, the effect judgment program 124 executes processing for adding the failure information to the template for the section event information (step 1209), and then executes processing for adding recovery prediction information to the template for the section event information (step 1210), thereby terminating the processing in this routine (step 1211). The recovery prediction information to be added is decided by referring to the failure restoration schedule information 122. For example, in a case of the RAID group degeneration, +0:30 which is the time required for alternation is adopted; and in a case of the fault of the RAID group, +4:00 which is the time required for replacement is adopted. Furthermore, required time according to the failure site and the failure type is also specified in the following processing and is set as the recovery prediction information.

Figure 20:
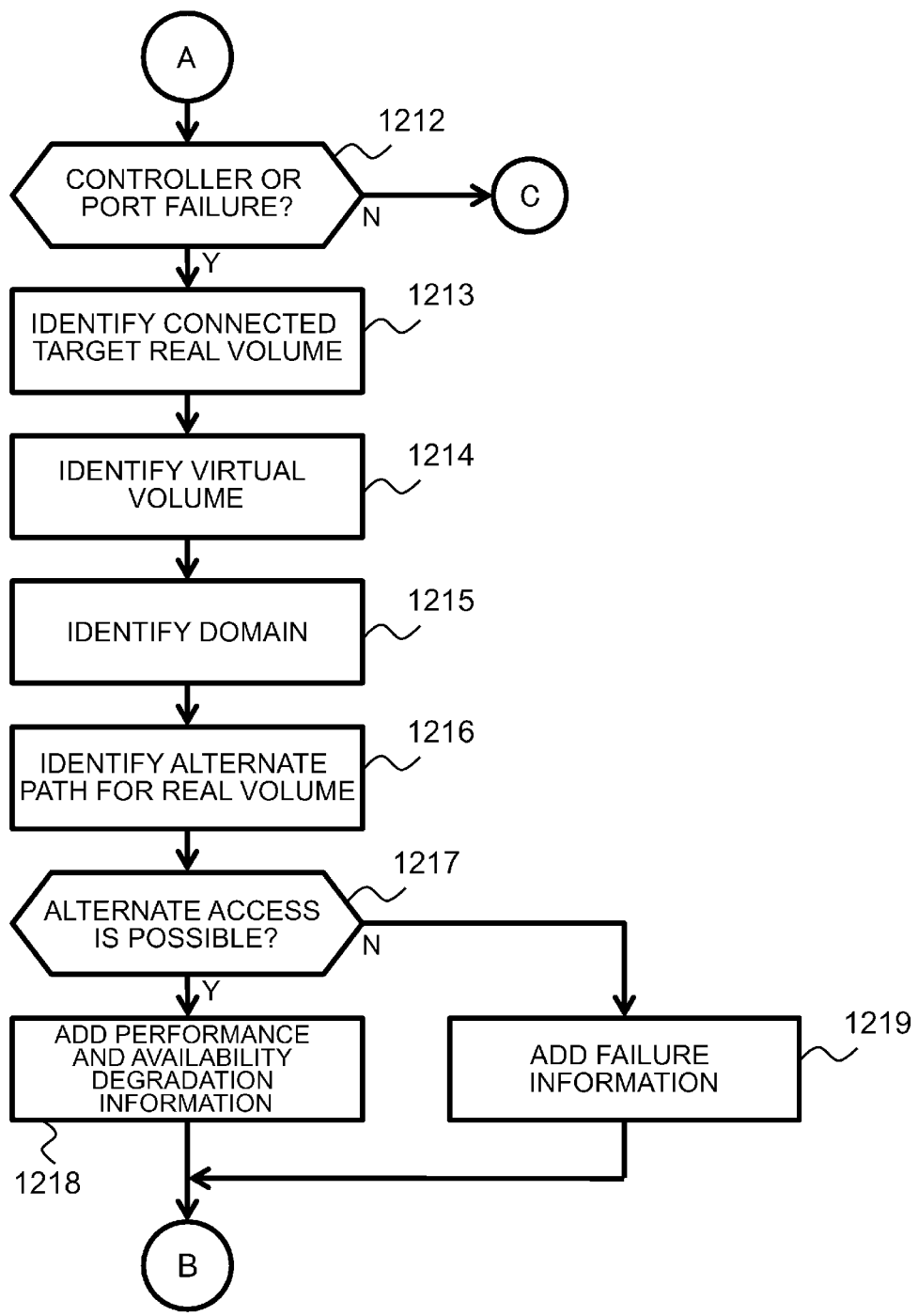
FIG. 20 is a flowchart explaining the storage effect judgment processing by the effect judgment program.

On the other hand, as shown in FIG. 20, if a negative judgment is returned in step 1201, the effect judgment program 124 judges, based on the received event, whether or not a failure has occurred in the controller 22 or the port, for example, the controller port 223 (step 1212). If a negative judgment is returned in step 1212, the effect judgment program 124 proceeds to processing in step 1220; and if an affirmative judgment is returned in step 1212, the effect judgment program 124 identifies a connected-target real volume as a connected target of the controller 22 or the controller port 223 (step 1213) as shown in FIG. 20.

For example, in a case of a failure of the controller ports CP00, CP10, the effect judgment program 124 identifies the real volume (PV0) 26 as the connected-target real volume 26 based on the resource connection information 523.

Next, the effect judgment program 124 identifies the virtual volume 371 based on the identified real volume 26 (step 1214) and identifies the domain based on the identified virtual volume 371 (step 1215). The effect judgment program 124 refers to the logical resource information 521 in order to execute the above processing. Subsequently, the effect judgment program 124 identifies an alternate path for the real volume 26 based on the identified domain (step 1216) and judges whether alternate access is possible or not (step 1217).

For example, the effect judgment program 124 refers to the physical resource information 522 and the resource connection information 523 and judges whether one of the connected target IDs of the identified real volumes 26 is NORMAL or not. If one of the connected target IDs of the identified real volumes 26 is NORMAL, this means the alternate access is possible. So, the effect judgment program 124 executes processing for adding the performance and availability degradation information to the template for the section event information (step 1218).

If a fault has occurred in all the connected target IDs of the identified real volumes 26, this means the alternate access is impossible. So, the effect judgment program 124 executes processing for adding the failure information to the template for the section event information (step 1219), Subsequently, the effect judgment program 124 executes processing for adding the recovery prediction information to the template for the section event information (step 1210) and terminates the processing in this routine (step 1211).

Figure 21:
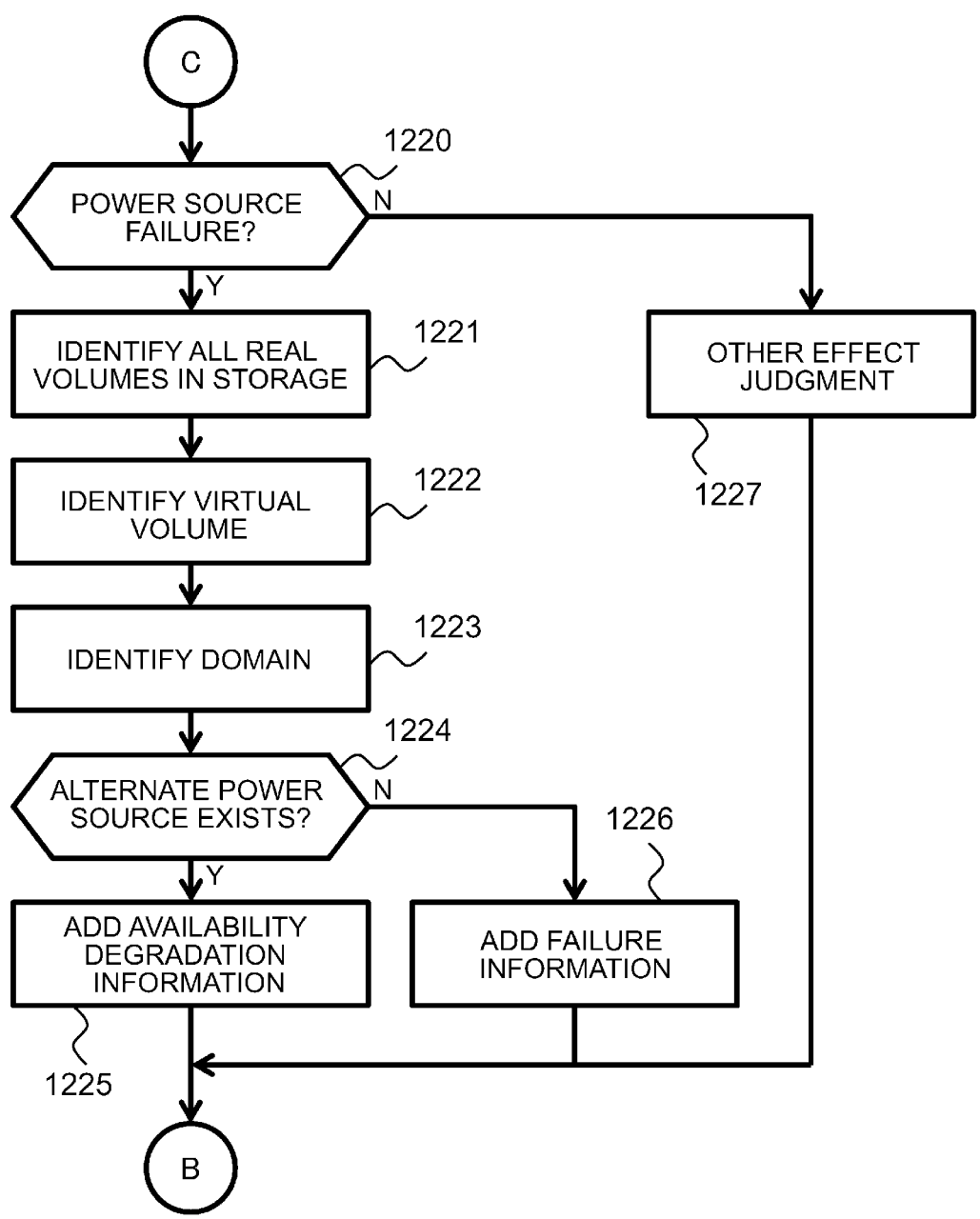
FIG. 21 is a flowchart explaining the storage effect judgment processing by the effect judgment program.

Furthermore, as shown in FIG. 21, if a negative judgment is returned in step 1212, the effect judgment program 124 judges whether a failure has occurred in the power source 24 of the storage apparatus 2 or not (step 1220). If an affirmative judgment is returned in step 1220, the effect judgment program 124 identifies all the real volumes of the storage apparatus 2 (step 1221), identifies the virtual volume 371 composed of the identified real volumes 26 (step 1222), and identifies the domain based on the identified virtual volume 371 (step 1223).

Next, the effect judgment program 124 refers to the physical resource information 522 and judges whether or not an alternate power source in normal operation state exists in the storage apparatus 2 which generated the event (step 1224).

Figure 19:
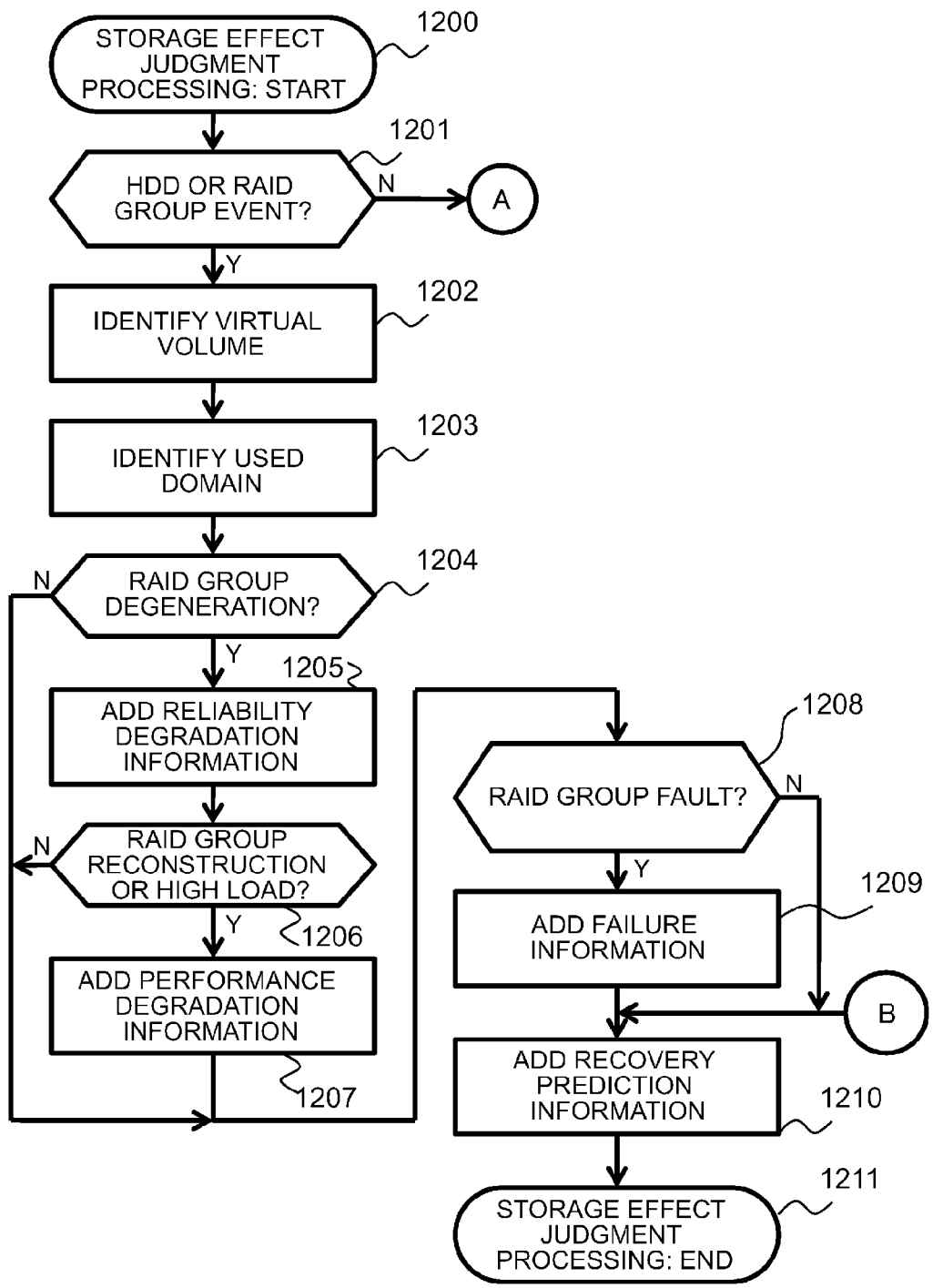
FIG. 19 is a flowchart explaining storage effect judgment processing for the effect judgment program.

If an affirmative judgment is returned in step 1224, the effect judgment program 124 recognizes the existence of the alternate power source and executes processing for adding the availability degradation information to the template for the section event information (step 1225) and then proceeds to processing in step 1210 in FIG. 19; and if a negative judgment is returned in step 1224, that is, if the alternate power source does not exist, the effect judgment program 124 executes processing for adding the failure information to the template for the section event information (step 1226) and then proceeds to processing in step 1210 in FIG. 19.

Furthermore, if a negative judgment is returned in step 1220 in FIG. 21, the effect judgment program 124 executes processing for judging other effects (step 1227), then executes processing for adding the recovery prediction information to the template for the section event information (step 1210), and terminates the processing in this routine (step 1211).

Figure 22:
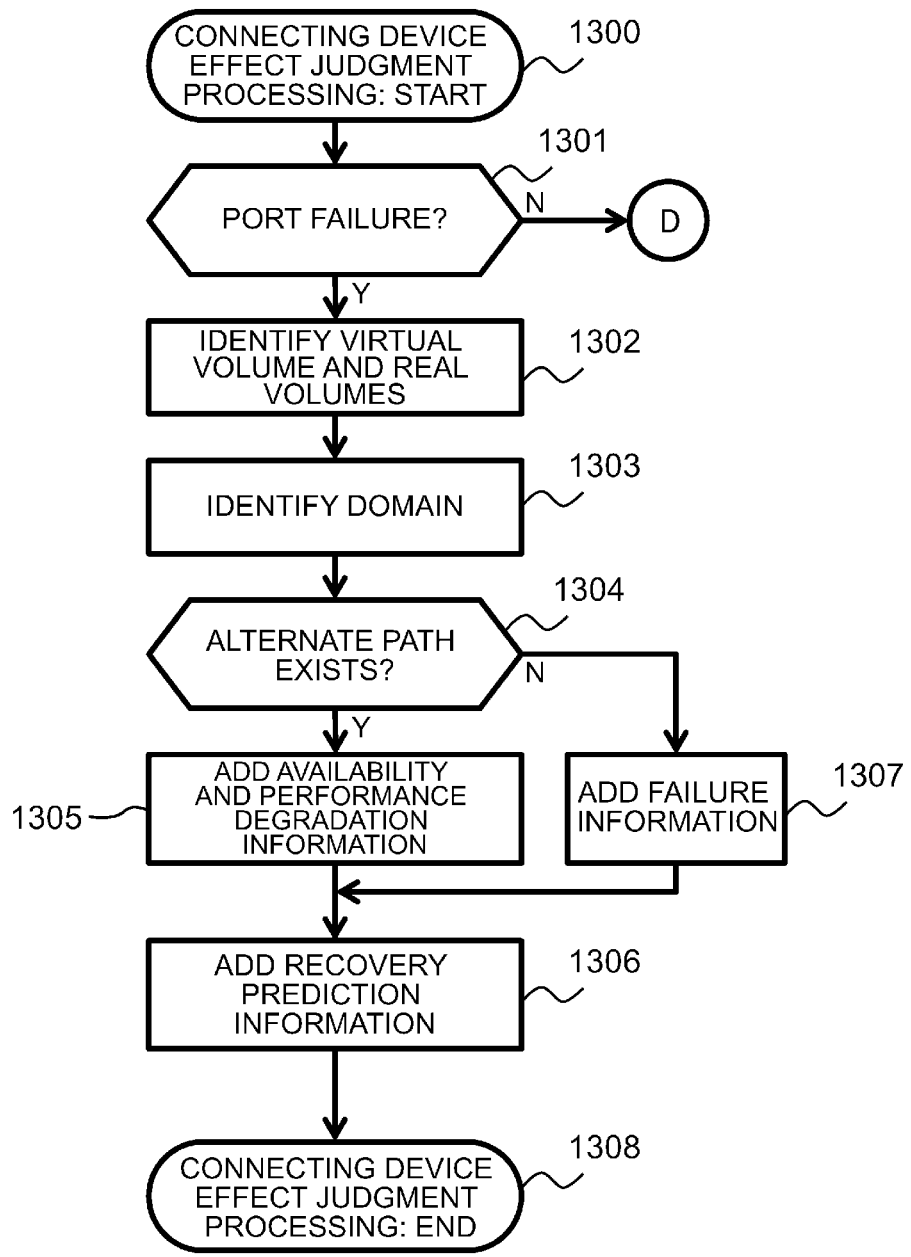
FIG. 22 is a flowchart explaining connecting-device effect judgment processing by the effect judgment program.

Next, the content of the connecting-device effect judgment processing will be explained with reference to flowcharts in FIG. 22 and FIG. 23.

If an affirmative judgment is returned in step 1106 in FIG. 18, the effect judgment program 124 starts the connecting-device effect judgment processing (step 1300).

The effect judgment program 124 judges, based on the received event, whether or not a failure has occurred in a port such as the relay port 41 (step 1301). If a negative judgment is returned in step 1301, the effect judgment program 124 proceeds to processing in step 1309; and if an affirmative judgment is returned in step 1301, the effect judgment program 124 identifies the real volumes 26, to or from which input or output is performed via this port, and the virtual volume 371, which is composed of these real volumes 26, based on information about the relay port 41, where the failure occurred, the logical resource information 521, and the resource connection information 523 (step 1302), identifies the domain based on the identified virtual volume 371 (step 1303), and judges, based on the physical resource information 522 and the resource connection information 523, whether an alternate path for the identified real volumes 26 exists or not (step 1304).

Next, if it is determined that the alternate path exists, the effect judgment program 124 executes processing for adding the availability and performance degradation information to the template for the section event information (step 1305), then executes processing for adding the recovery prediction information to the template for the section event information (step 1306), and terminates the processing in this routine (step 1308).

On the other hand, if a negative judgment is returned in step 1304, this means the alternate path does not exist. So, the effect judgment program 1214 executes processing for adding the failure information to the template for the section event information (step 1307), executes processing for adding the recovery prediction information to the template for the section event information (step 1306), and terminates the processing in this routine (step 1308).

Figure 23:
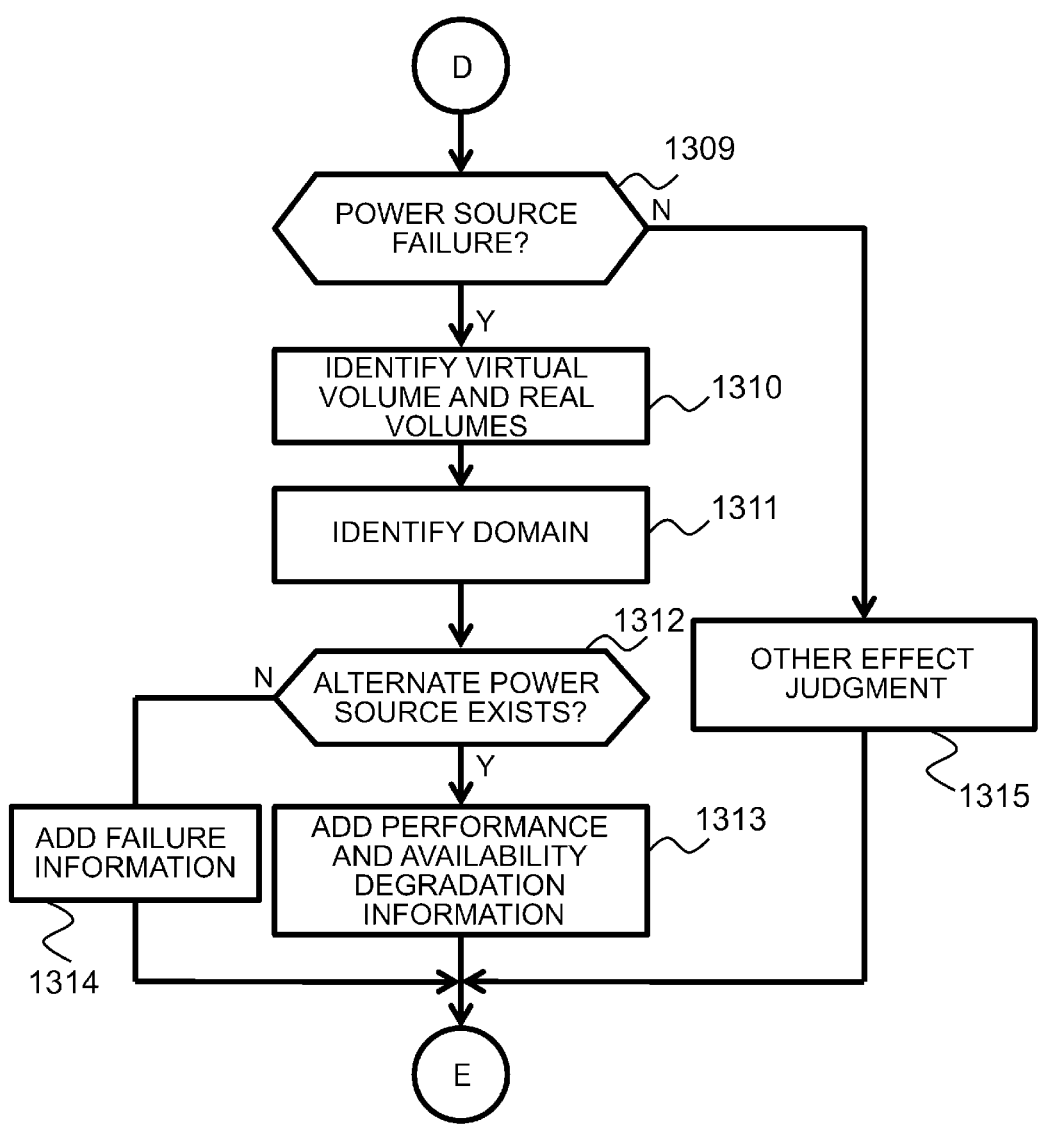
FIG. 23 is a flowchart explaining the connecting-device effect judgment processing by the effect judgment program.

Furthermore, as shown in FIG. 23, if a negative judgment is returned in step 1301, the effect judgment program 124 judges whether a failure has occurred in the power source 42 in the relay device 4 or not (step 1309). If an affirmative judgment is returned in step 1309, the effect judgment program 124 identifies the real volumes 26 (usually a plurality of real volumes 26), to/from which input or output is performed via the connecting device 4 where the failure occurred, and the virtual volume 371 which is formed of these real volumes (step 1310), identifies the domain based on the identified virtual volume 371 (step 1311), and judges whether or not an alternate power source exists in the connecting device 4 where the failure occurred, by referring to the physical resource information 522 (step 1312).

If an affirmative judgment is returned in step 1312, the effect judgment program 124 executes processing for adding the availability degradation information to the template for the section event information (step 1313) and proceeds to step 1306.

If a negative judgment is returned in step 1312, that is, if the alternate power source does not exist, the effect judgment program 124 executes processing for adding the failure information to the template for the section event information (step 1314) and proceeds to step 1308.

Furthermore, if a negative judgment is returned in step 1309, the effect judgment program 124 executes processing for judging the other effects (step 1315) and proceeds to step 1306.

Figure 24:
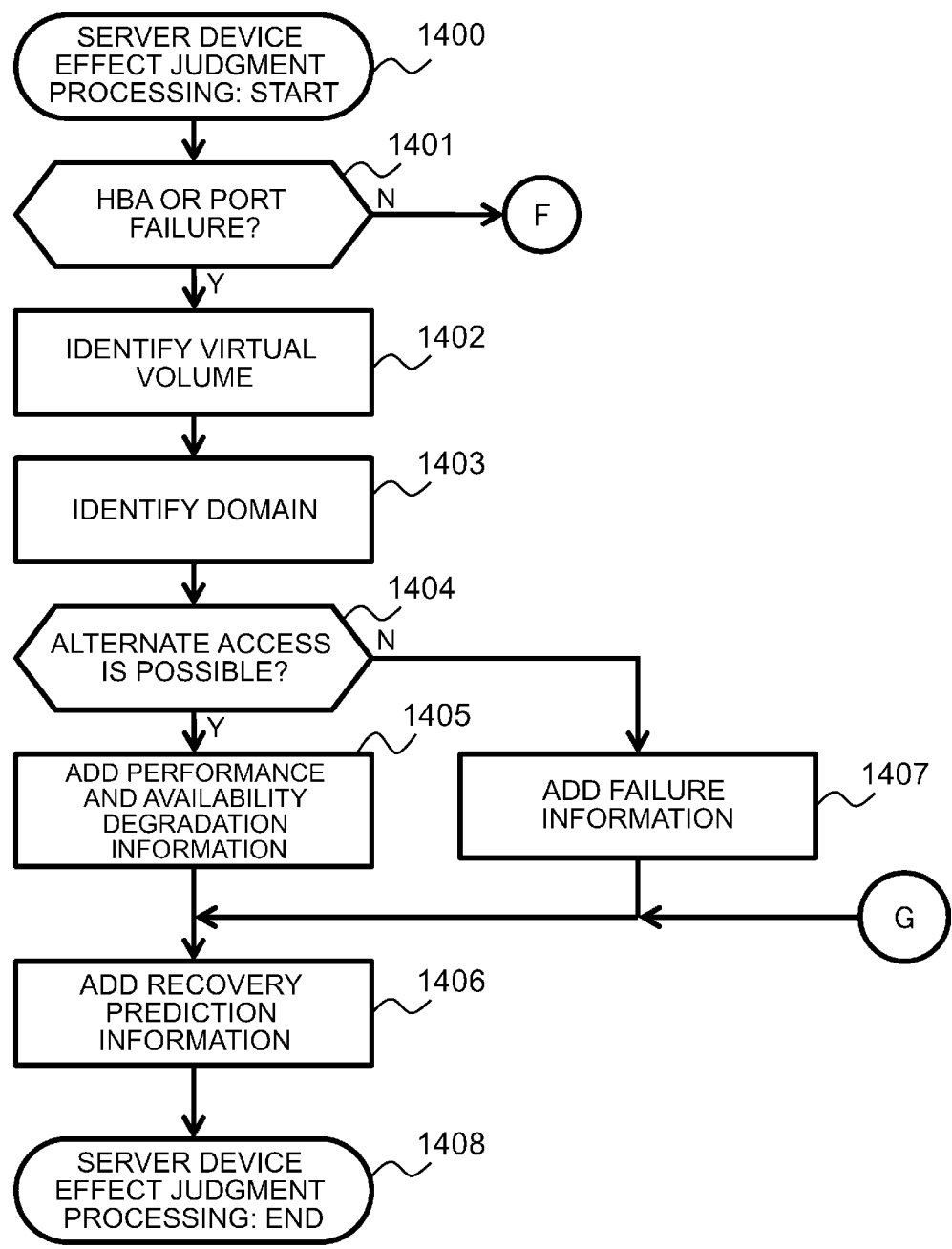
FIG. 24 is a flowchart explaining server-device effect judgment processing by the effect judgment program.

Next, the content of the server-device effect judgment processing will be explained with reference to flowcharts in FIG. 24 and FIG. 25.

If an affirmative judgment is returned in step 1108 in FIG. 18, the effect judgment program 124 starts the server-device effect judgment processing (step 1400).

The effect judgment program 124 judges, based on the received event, whether or not a failure has occurred in the host bus adapter (HBA) 33 or a port such as the host port 331 (step 1401). If a negative judgment is returned in step 1401, the effect judgment program 124 proceeds to processing in step 1409; and if an affirmative judgment is returned in step 1401, the effect judgment program 124 identifies the virtual volume 371, which is configured in the hypervisor 37 of the server device 3 having this host bus adapter 33 or the host port 331, based on the logical resource information 521 and the physical resource information 522 (step 1402), identifies the domain based on the identified virtual volume 371 (step 1403), and judges whether alternate access to the real volumes 26 constituting the virtual volume 371 is possible or not, by referring to the logical resource information 521, the physical resource information 522, and the resource connection information 523 (step 1404).

If an affirmative judgment is returned in step 1404, that is, if the alternate access is possible, the effect judgment program 124 executes processing for adding the performance and availability degradation information to the template for the section event information (step 1405), then executes processing for adding the recovery prediction information to the template for the section event information (step 1406), and terminates the processing in this routine (step 1408).

On the other hand, if a negative judgment is returned in step 1404, that is, if the alternate access is impossible, the effect judgment program 124 executes processing for adding the failure information to the template for the section event information (step 1407), and then proceeds to processing in step 1406.

Figure 25:
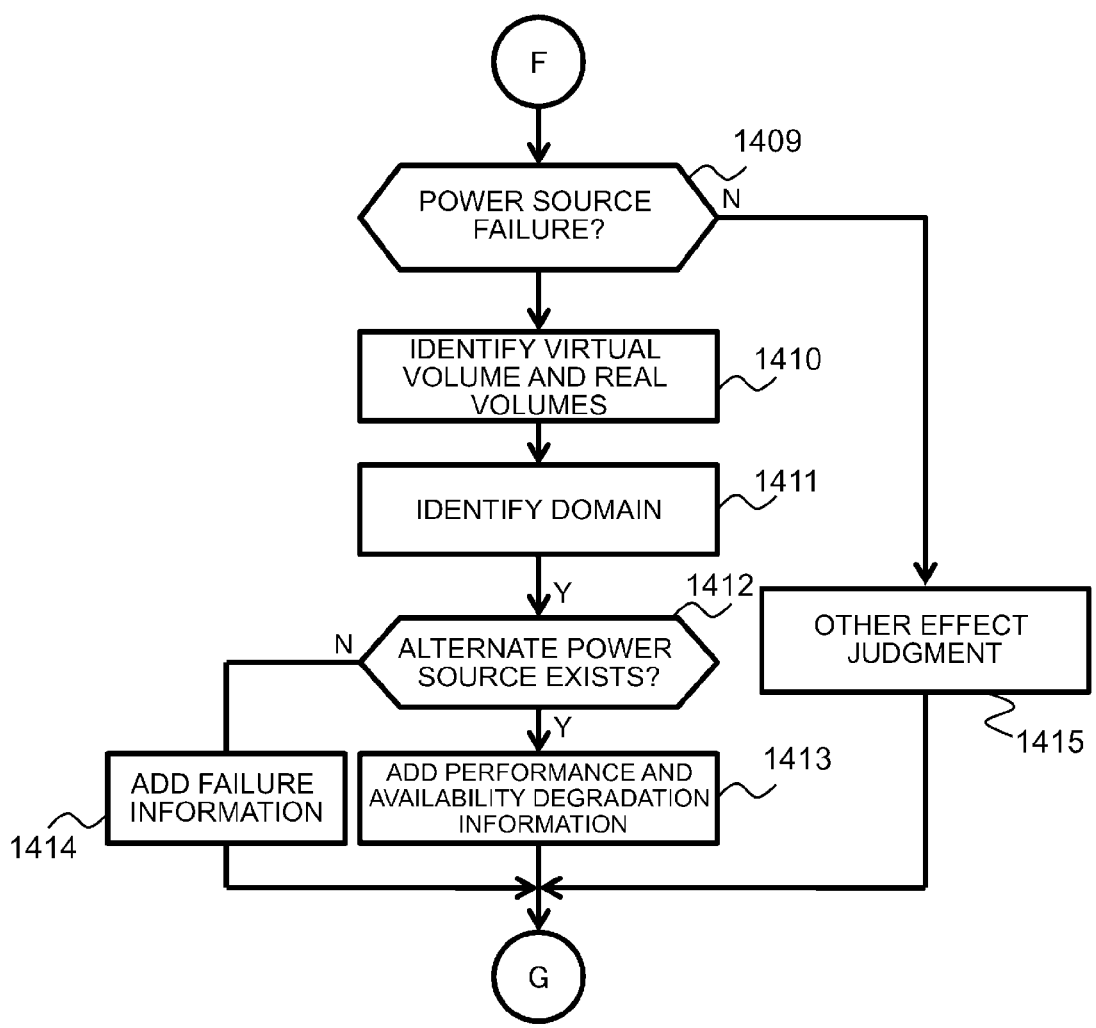
FIG. 25 is a flowchart explaining the server-device effect judgment processing by the effect judgment program.

On the other hand, as shown in FIG. 25, if a negative judgment is returned in step 1401, the effect judgment program 124 judges whether or not a failure has occurred in the power source 34 in the server device 3 (step 1409). If an affirmative judgment is returned in step 1409, the effect judgment program 124 identifies the virtual volume 321, which is configured in the hypervisor 37 of the server device 3 where the failure occurred, based on the logical resource information 521 (step 1410), identifies the domain based on the identified virtual volume 321 (step 1411), and identifies, based on the physical resource information 522, whether or not an alternate power source exists in the server device 3 where the failure occurred (step 1412).

If an affirmative judgment is returned in step 1412, the effect judgment program 124 executes processing for adding the availability degradation information to the template for the section event information (step 1413), and then proceeds to processing in step 1406.

If a negative judgment is returned in step 1410, that is, if the alternate power source does not exist, the effect judgment program 124 executes processing for adding the failure information to the template for the section event information (step 1414), and then proceeds to processing in step 1406.

Furthermore, if a negative judgment is returned in step 1409, the effect judgment program 124 executes processing for judging other effects (step 1415), then executes processing for adding the recovery prediction information to the template for the section event information (step 1406), and terminates the processing in this routine (step 1408).

Figure 26:
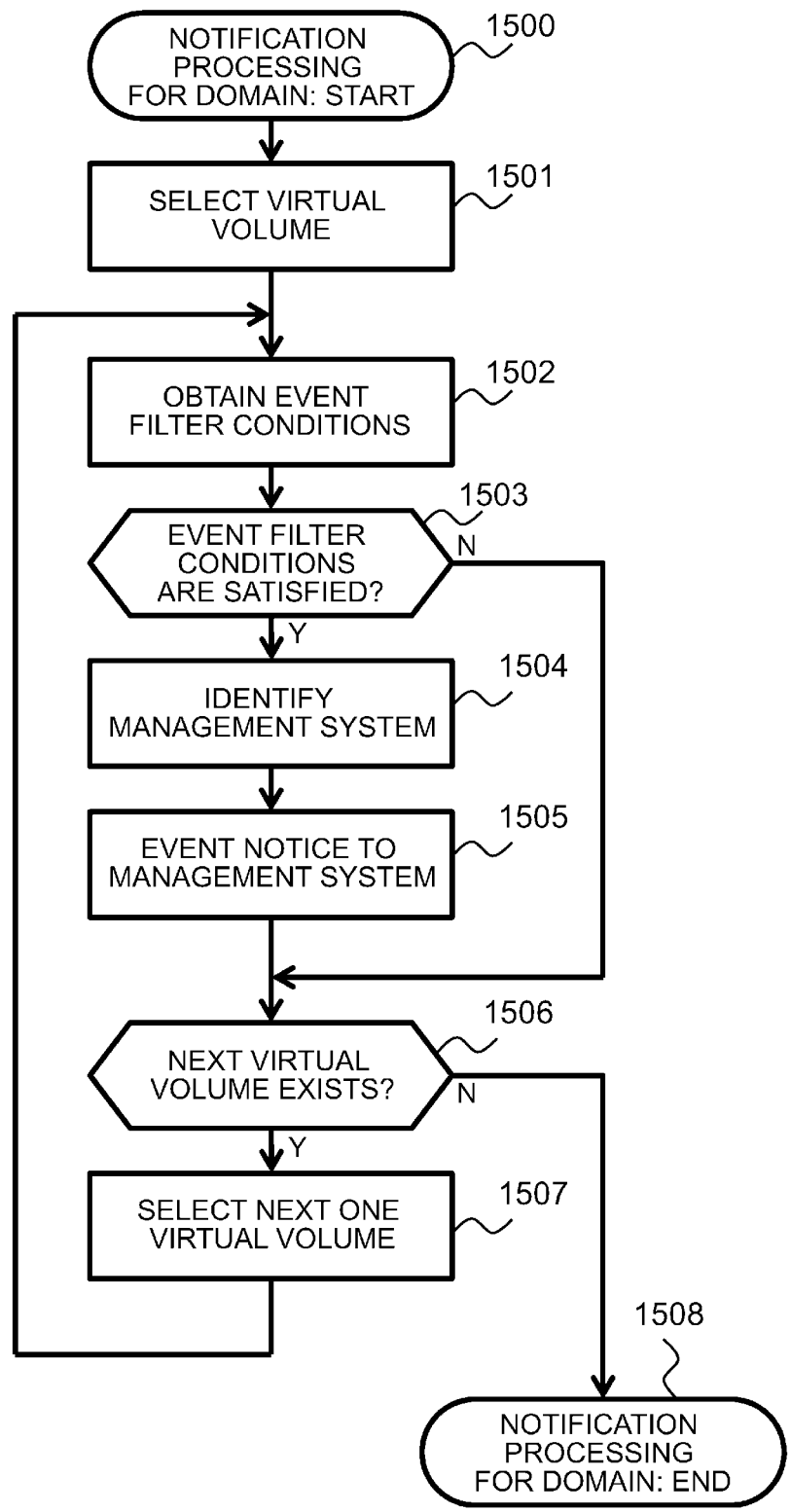
FIG. 26 is a flowchart explaining processing by a notification program for a domain.

Next, the processing content of the event notification program (for the domain administrator) 125 will be explained with reference to a flowchart in FIG. 26.

This processing is started by activation of the event notification program (for the domain administrator) 125 by the processor 11 for the event notification system 1 in step 111 of the processing flow shown in FIG. 18 (step 1500). The target of the following sequence of processing is the template for the section event information formed by the effect judgment program 124. At this point, the template for the section event information has become a complete form of the section event information to be reported to the section management system 61.

The event notification program (for the domain administrator) 125 selects one virtual volume 371 included in the template for the section event information (step 1501), obtains event notice settings defined for the selected virtual volume 371 from the event filter information 121, and judges whether or not any information that satisfies notification conditions of the event notice settings exists in the content of the received event (step 1503).

Next, if an affirmative judgment is returned in step 1503, the event notification program (for the domain administrator) 125 identifies the domain, to which the virtual volume 371 is allocated, based on the logical resource information 521, further identifies an event notice destination of the management system 61, which manages that domain, based on the domain information 524 (step 1504), and executes processing for notifying the identified management system 61 of the section event information (step 1505). The content of the notice includes the identifier of the virtual volume 371, information indicating the occurred incident of the service level violation, and information indicating the overview of the cause. Furthermore, the content of the notice can include the restoration scheduled time based on the time required for alternation 122C or the time required for replacement 122D, the event occurrence time, and information about the service level defined for the virtual volume 371.

Subsequently, the event notification program (for the domain administrator) 125 judges whether or not information about the next virtual volume 371 is included in the section event information (step 1506); and if an affirmative judgment is returned in step 1506, the event notification program (for the domain administrator) 125 selects next one virtual volume 371 (step 1507) and then repeats the processing from step 1502 to step 1506.

If a negative judgment is returned in step 1503, the event notification program (for the domain administrator) 125 executes processing in step 1506; and if a negative judgment is returned in step 1506, the event notification program (for the domain administrator) 125 terminates the processing in this routine (step 1508).

Figure 27:
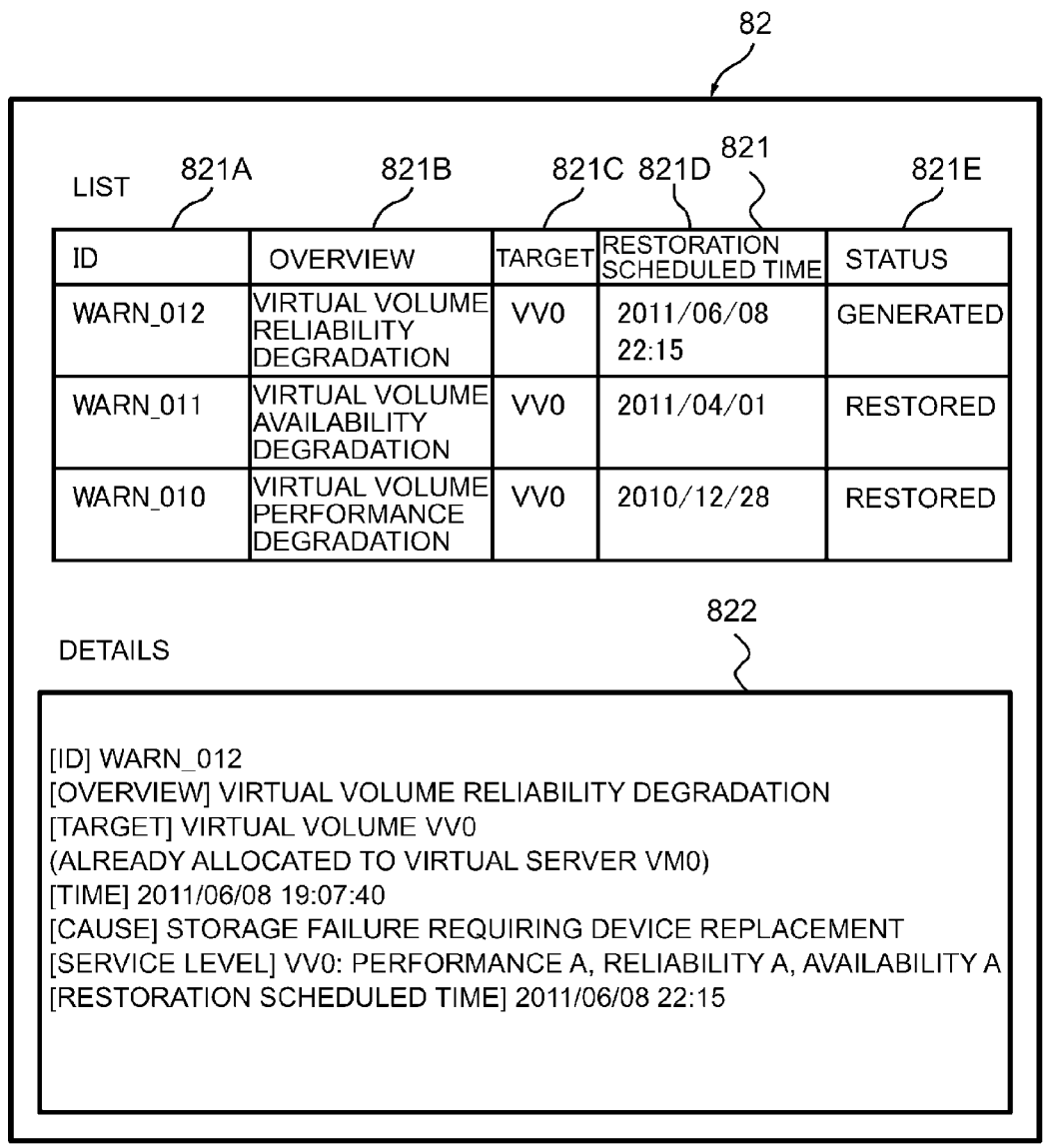
FIG. 27 is a screen configuration diagram showing a display example of a domain event information display screen.

Next, FIG. 27 shows a display example of a domain event information display screen.

Referring to FIG. 27, a domain event information display screen 82 is a screen displayed on the user terminal used by the section administrator and is constituted from a list 821 and a details area 822. The domain event information display screen 82 is formed by the section management system 61 and information displayed on this screen is based on the section event information sent by the event notification program (for the domain administrator) 125 to the section management system 61.

The list 821 is constituted from an ID 821A, an overview 821B, a target 821C, restoration scheduled time 821 D, and a status 821 E.

The ID 821A displays an identifier for identifying the relevant event. For example, a first entry displays WARN_012 as the identifier of the relevant event. The overview 821 B displays information about the overview of the relevant service level violation incident. For example, if the reliability of the virtual volume 371 degrades, the overview 821B displays Virtual Volume Reliability Degradation. The target 821C displays an identifier for identifying the site where the relevant failure occurred. For example, if a failure occurs in the virtual volume #0 371, the target 821C displays VV0. The restoration scheduled time 821 D displays the scheduled date and time for restoration of the failure site restoration. The status 821E displays: GENERATED when an event is generated; or RESTORED when the failure site has been restored. Whether the failure has been restored or not is judged and displayed based on the logical resource information 521 and the physical resource information 522.

The details area 822 displays the details of the relevant event relating to which the failure occurred. This details area 822 displays the content of an entry selected from the list 821 as detailed information. For example, if WARN_012 of the first entry is selected from the list 821, the details area 822 displays the overview, target, time, cause, service level, and restoration scheduled time as display items with respect to the selected identifier.

The overview area displays Virtual Volume Reliability Degradation and the target area displays Virtual Volume VV0 (already allocated to Virtual Server VM0).

The time area displays a date and time of the occurrence of the failure. The cause area displays, for example, Storage Failure Requiring Device Replacement and the service level area displays, for example, Performance A, Reliability A, and Availability A as the service level set to the virtual volume VV0. Furthermore, the restoration scheduled time area displays the scheduled date and time of restoration of the failure site.

The user can recognize the information displayed in the list 821 and the details area 822 on the domain event information display screen 82 by operating the domain event information display screen 82 of the user terminal.

Figure 28:
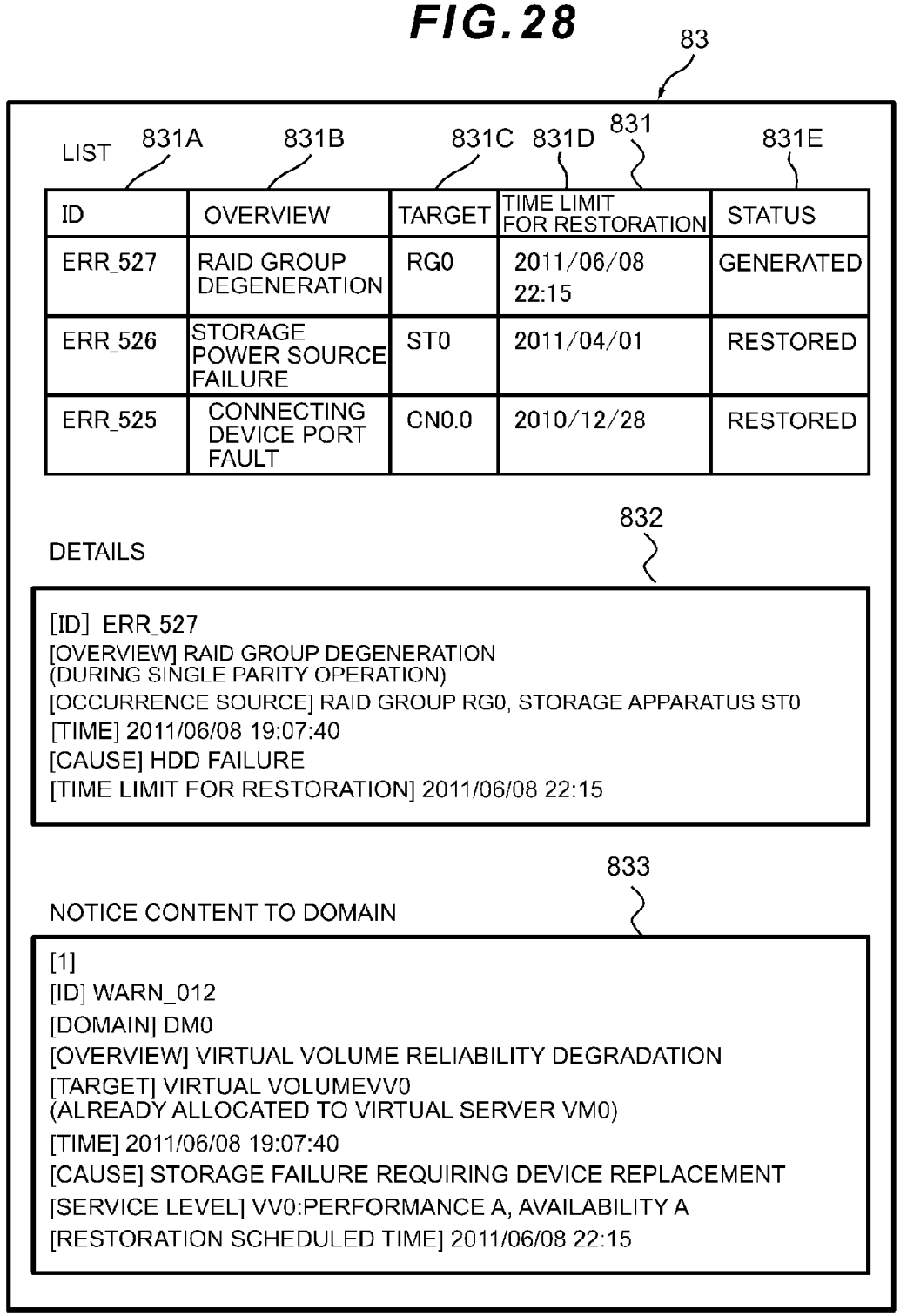
FIG. 28 is a screen configuration diagram showing a display example of a system administrator event display screen.

Next, FIG. 28 shows a display example of a system information display screen.

Referring to FIG. 28, a system information display screen 83 is a display screen of a terminal used by the system administrator 930 and is constituted from a list 831, a details area 832, and a notice-content-to-domain area 833. The system information display screen 83 is formed by the overall management system 71 and information displayed on this screen is based on the event information and the section event information sent by the event notification program (for the system administrator) 126 to the overall management system 71.

The list 831 displays a list of events sent from various devices and displays, with respect to each event, an ID 831A, an overview 831B, a target 831C, time limit for restoration 831D, and a status 831E.

The ID 831A displays an identifier for identifying the relevant event, for example, ERR_527. The overview 831B displays, as the overview of the relevant event, for example: RAID Group Degeneration when a RAID group in the storage apparatus 2 has degenerated; or Storage Power Source Failure when a failure occurred in the power source 24 for the storage apparatus 2.

The target 831C displays an identifier for identifying the site where the relevant failure occurred. For example, if a RAID group regarding which the RAID group degeneration has occurred belongs to RG #0, the target 831C displays RG0.

The time limit for restoration 831D displays a date and time of the time limit for restoration of the failure site. The time limit for restoration is calculated from the failure restoration schedule information 122 and the failure occurrence time included in the event.

The status 831E displays: GENERATED when an event is generated; or RESTORED when the failure site has been restored after the generation of the event.

If the administrator selects any of entries of the list 831, the details area 832 displays the content of the selected entry. For example, if a first entry of the list 831 is selected, the details area 832 displays, as the content of the selected entry, its ID, RAID Group Degeneration (during Single Parity Operation) as the overview, RAID Group RG0 and Storage Apparatus ST0 as failure occurrence sites.

Furthermore, the time area displays a date and time of the occurrence of the failure. The cause area displays, for example, HDD Failure as a cause of the failure occurrence. The time limit for restoration displays the time limit (date and time) of restoration of the failure site.

The notice-content-to-domain area 833 displays the section event information, which is caused by the event selected in the list 831 and reported to the section management system 61, in the same format as that for the content displayed in the details area 822 on the domain event information display screen 82 in FIG. 27.

The system administrator 930 can recognize the information displayed in the list 831, the details area 832, and the notice-content-to-domain area 833 on the system information display screen 83 by operating the system information display screen 83.

If items for specifying the service level are defined in the service level information corresponding to the identified virtual volume 371, the event notification system 1 calculates whether or not the service level violation incident has occurred, based on the received event and notifies the section management system 61 of the result as the event 91 based on the event filter according to this embodiment.

According to this embodiment, the section administrator 931 can recognize the occurrence of an incident in violation of the service level by accessing the section management system 61, using the user terminal.

Furthermore, according to this embodiment, the event notification system 1 notifies the overall management system 71 of the content of the event in violation of the service level and also notifies the overall management system 71 of the failure information which associates the content of the extracted event and the site where the failure occurred.

As a result, according to this embodiment, the system administrator 930 for managing the entire system can recognize the content of the event in violation of the service level and also recognize the content of the failure information, which associates the content of the extracted event and the site where the failure occurred, by operating the overall management system 71, using the system administrator terminal.

Figure 29:
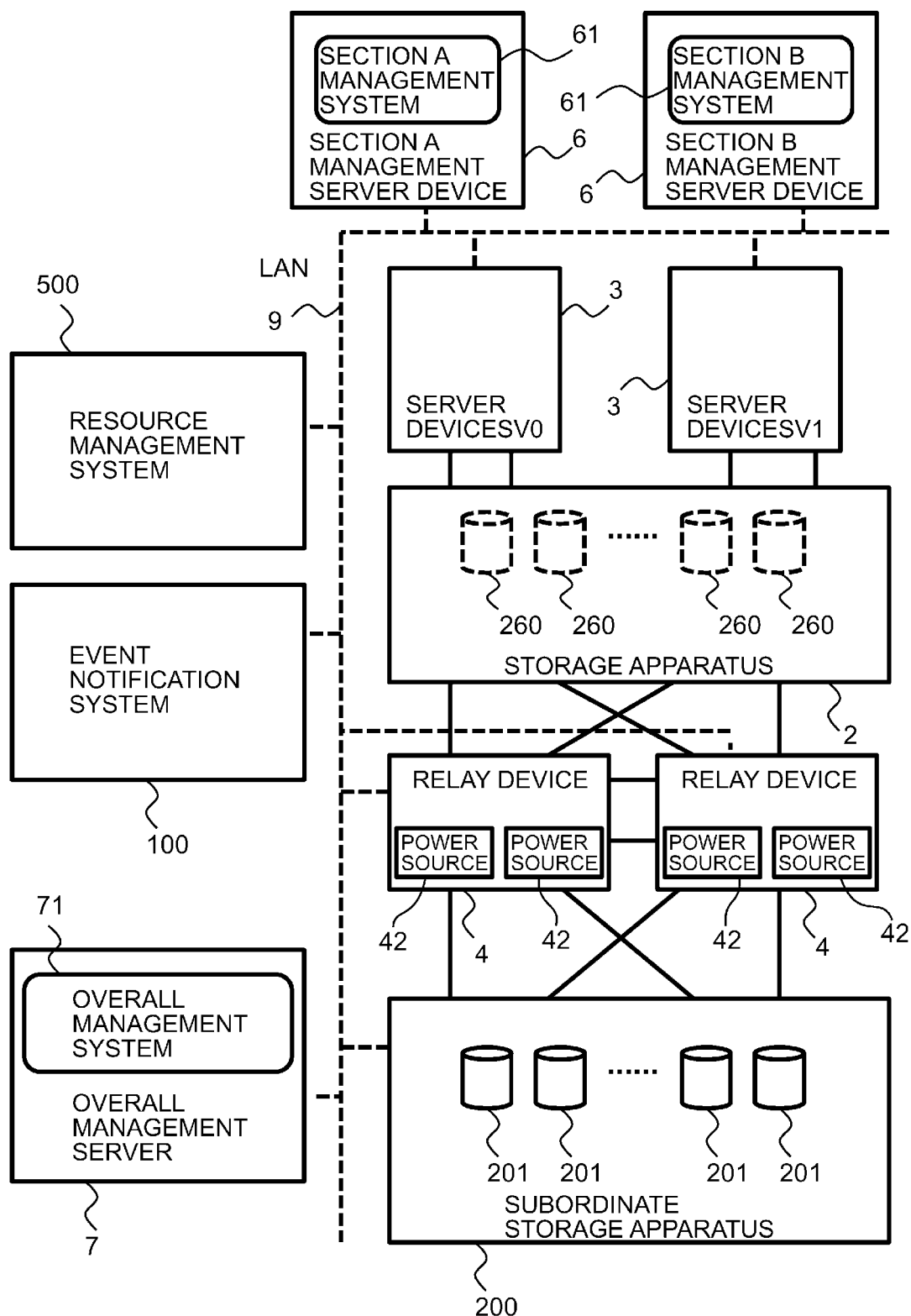
FIG. 29 is a block diagram showing the overall configuration of a computer system according to a second embodiment.

Next, FIG. 29 shows a block configuration diagram of a computer system according to a second embodiment.

Referring to FIG. 29, the computer system is constituted from an event notification system 100, a storage apparatus 2, server devices 3, a plurality of relay devices 4, a resource management system 500, a section A management server device 6, a section B management server device 6, an overall management server 7, and a subordinate storage apparatus 200; and the respective elements are connected via an internal network 9. For example, a LAN can be used as the internal network 9.

With the computer system according to this embodiment, the event notification system 100 is used instead of the event notification system 1, the resource management system 500 is used instead of the resource management system 5, the storage apparatus 2 is located between the plurality of server devices 3 and the plurality of relay devices 4, and the subordinate storage apparatus 200 is located as a storage apparatus belonging to a subordinate tier of each relay device 4. Each server device 3, each relay device 4, the section A management server device 6, the section B management server device 6, and the event notification system 7 can be respectively composed of the same elements according to the first embodiment.

The subordinate storage apparatus 200 has a plurality of real volumes 201; and it also has a subordinate storage event generator (not shown) for generating an event(s) if a failure occurs in any of a plurality of subordinate storage resources constituting the subordinate storage apparatus 200.

Each real volume 201 is composed of storage areas of one or more subordinate storage devices. For example, HDDs (Hard Disk Drives), semiconductor memory devices, optical disk devices, magneto-optical disk devices, magnetic tape devices, and flexible disk devices can be used as the subordinate storage devices.

The storage apparatus 2 has a function sending/receiving information or data to/from the subordinate storage apparatus 200 via each relay device 4 and also has a function as a storage event generator (not shown) for generating an event(s) if a failure occurs in any of the plurality of storage resources constituting the storage apparatus 2.

The storage apparatus 2 has a function as a virtualization mechanism so that it virtualizes a plurality of real volumes 201 composed of storage areas of the subordinate storage devices (not shown) of the subordinate storage apparatus 200 to be a plurality of virtual volumes 260 and manages the plurality of virtualized virtual volumes 260. Each virtual volume 260 is provided by the virtualization mechanism of the storage apparatus 2 in order for, for example, each server device 3 to store data.

The subordinate storage apparatus 200 can be constituted from, for example, subordinate storage units (not shown)

having one or more subordinate storage devices, and a subordinate controller (not shown) for sending/receiving information to/from the storage apparatus 2 via each relay device 4 and controlling data input to, or output from, the subordinate storage units in response to an access request.

Each server device (SV0, SV1) 3 has a function sending/receiving information to/from the storage apparatus 2 and also has a function as a server event generator (not shown) for generating an event(s) if a failure occurs in any of the plurality of server resources constituting the server device 3.

Each relay device 4 has a function relaying information or data sent and received between the storage apparatus 2 and the subordinate storage apparatus 200 and also has a function as a relay event generator (not shown) for generating an event(s) if a failure occurs in any of the plurality of relay resources constituting each relay device 4.

The resource management system 500 manages the plurality of storage resources (resources including physical resources and logical resources) constituting the storage apparatus 2, the plurality of server resources (resources including physical resources and logical resources) constituting each server device 3, the plurality of relay resources (resources including physical resources and logical resources) constituting each relay device 4, and the plurality of subordinate storage resources (resources including physical resources and logical resources) constituting the subordinate storage apparatus 200.

The event notification system 100 has a processor, a memory, and a network controller (any of which is not shown). If an event is generated by any of each server device 3, the storage apparatus 2, each relay device 4, and the subordinate storage apparatus 200, the event notification system 1 receives the event via the internal network 9, judges the content of the received event, and identifies a virtual volume 260 to be affected by the generation of the event from among the plurality of virtual volumes 260.

If the items for specifying the service levels are defined in the service level information (not shown) corresponding to the identified virtual volume 260 under the above-described circumstance, the event notification system 100 calculates whether an incident in violation of the defined service level has occurred or not, based on the received event in accordance with the event filter information 121; and notifies, for example, the section management system 61 of the result.

Furthermore, the event notification system 100 notifies the overall management system 71 of the event 92 which associates the event received from the device and the service level violation incident.

Figure 30:
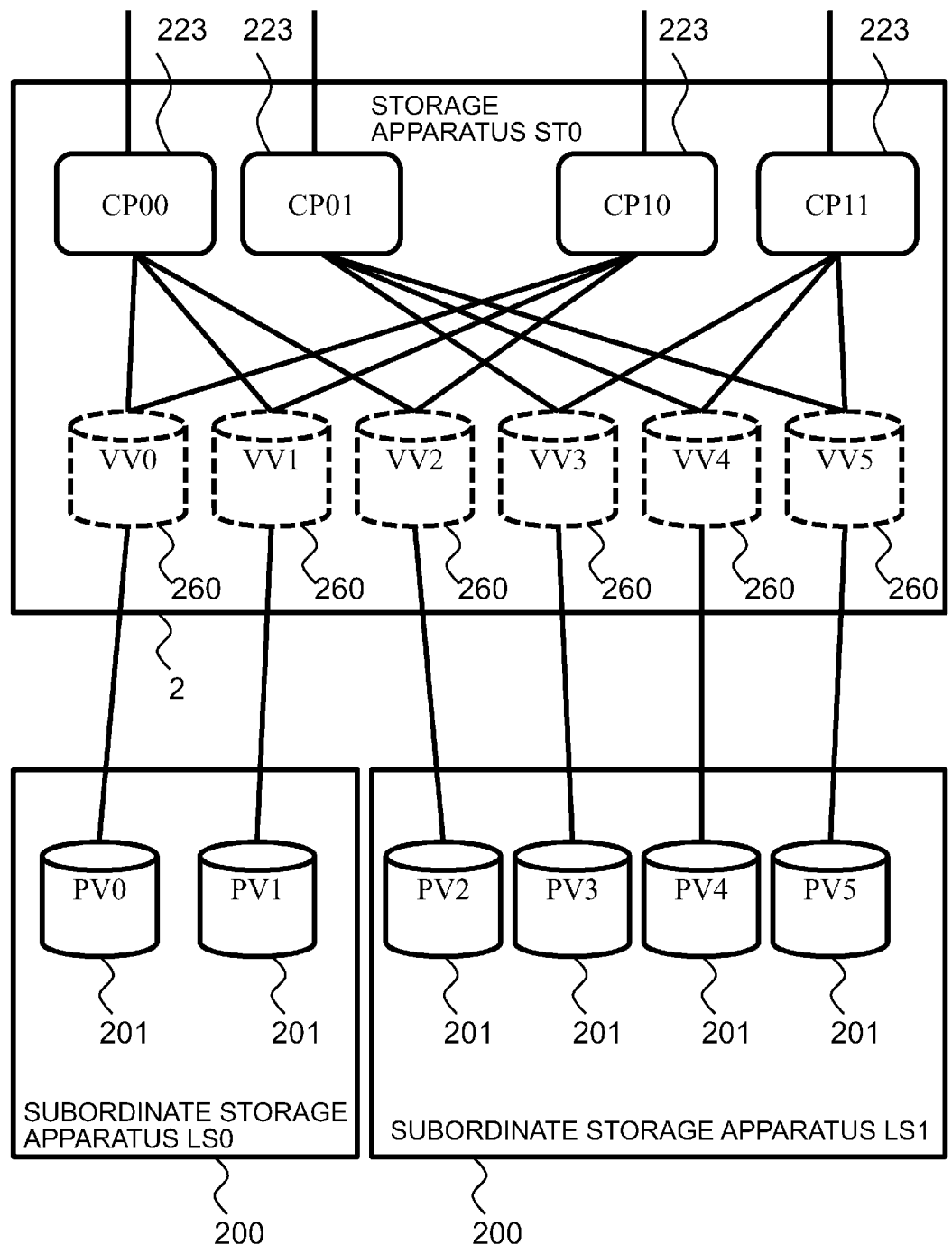
FIG. 30 is a logical configuration diagram of a storage apparatus according to the second embodiment.

Next, FIG. 30 shows a logical configuration diagram of the storage apparatus and the subordinate storage apparatuses.

If a plurality of real volumes (PV0, PV1) 201 are mounted in a subordinate storage apparatus #0 200 and a plurality of real volumes (PV2 to PV5) 201 are mounted in a subordinate storage apparatus #1 200 as shown in FIG. 30, the storage apparatus 2 virtualizes the real volume (PV0) 201 to configure a virtual volume (VV0) 260 and virtualizes the real volume (PV1) 201 to configure a virtual volume (VV0) 260. Furthermore, the storage apparatus 2 virtualizes the real volumes (PV2 to PV5) 201 respectively to configure virtual volumes (VV2 to VV5) 260.

Under this circumstance, the storage apparatus 2 connects each virtual volume (VV0 to VV2) 260 to each controller port (CP00, CP10) 223, connects each virtual volume (VV3 to VV5) 260 to each controller port (CP01, CP11) 223, and provides each virtual volume (VV0 to VV5) 260 as an access target of the user terminal to each server device 3.

Next, FIG. 31 shows a configuration diagram of logical resource information.

Referring to FIG. 31, logical resource information 5210 is information for managing a plurality of logical resources constituting the storage apparatus 2 or the subordinate storage apparatus 200 and is constituted from an ID field 5210A, a type field 5210B, a subordinate resource ID field 5210C, and a domain ID field 5210D.

The ID is information about an identifier for uniquely identifying each logical resource. Each entry of this ID field 5210A stores: PV0 to PV5 when identifying a real volume 201; and VV0 to VV5 when identifying a virtual volume 260.

The type is information about a name for identifying the type of each logical resource. Each entry of the type field 5210B stores REAL VOLUME when the relevant logical resource is a real volume 201.

The subordinate resource ID is an identifier for identifying a resource located at a subordinate position of the logical resource with the relevant ID. Each entry of the subordinate resource ID field 5210C stores the identifier of the relevant subordinate resource.

For example, if the real volume 201 is composed of a storage device of the storage apparatus #0 (LS0) 200, an entry corresponding to the real volume 201 composed of the storage apparatus #0 (LS0) 200 stores LS0. Furthermore, if the virtual volume 260 is composed of the real volumes (PV0 to PV5) 201, an entry corresponding to this virtual volume 260 stores PV0 to PV5.

The domain ID is an identifier for identifying a domain used for the relevant virtual volume 260. An entry corresponding to the virtual volume 260 from among entries of the domain ID field 5210D stores DM0 or DM1 as information about the identifier.

Next, FIG. 32 shows another configuration diagram of the event filter information.

Referring to FIG. 32, event filter information 127 is information used instead of the event filter information 121 and is constituted from a virtual volume ID field 127A and a received logical message field 1278.

The virtual volume ID is information about an identifier for identifying a virtual volume 371. Each entry of the virtual volume ID field 127A stores, for example, VV0 to VV3, as the identifier for identifying the relevant virtual volume 371.

The received logical message is information about logical messages received by the user terminal. Each entry of the received logical message field 127B stores information about the received logical message. For example, if performance degradation, reliability degradation, and availability degradation occur with respect to the virtual volume 371, an entry of the received logical message field 1278 corresponding to this virtual volume 371 stores information indicating Performance Degradation, Reliability Degradation, and Availability Degradation.

According to this embodiment, the section administrator 931 can recognize an incident(s) in violation of the service level by accessing the section management system 61, using the user terminal.

Furthermore, according to this embodiment, the system administrator 930 for managing the entire system can recognize the content of an even in violation of the service level by operating the overall management system 71, using the system administrator terminal, and recognize a failure by associating the site where the failure occurred, with the incident in violation of the service level.

Incidentally, the present invention is not limited to the aforementioned embodiments, and includes various variations. For example, the aforementioned embodiments have been described in detail in order to explain the invention in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, part of the configuration of each embodiment can be deleted, or added to, or replaced with, the configuration of another configuration.

Furthermore, part or all of the aforementioned configurations, functions, processing units, processing means, and so on may be realized by hardware by, for example, designing them in integrated circuits. Also, each of the aforementioned configurations, functions, and so on may be realized by software by processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

REFERENCE SIGNS LIST

1 Event notification system
2 Storage apparatus
3 Server device
4 Relay device
5 Resource management system
6 Section A management server device, section B management server device
7 Event notification system
26 Real volume
38 Virtual server
371 Virtual volume
22 Controller

The invention claimed is:

1. A computer system comprising:
   at least one storage apparatus having at least one controller and at least one storage device, and providing a plurality of virtual volumes;
   at least one server having at least one processor and at least one memory, and providing a plurality of virtual servers;
   a management system managing a plurality of domains, each one of the plurality of domains includes the one or more virtual volumes and at least one virtual server; and
   an event notification system having event filter information and resource information, the event filter information managing notification conditions related to service levels for the plurality of virtual volumes, the resource information managing a relationship between the plurality of domains, the plurality of virtual volumes and the plurality of virtual servers,
   wherein when a failure occurs in the computer system, the event notification system is configured to:
   receive an event information from the computer system, the event information indicates content of the failure and a failure part of the computer system,
   identify at least one virtual volume related to the failure part of the computer system in the plurality of virtual volumes on the basis of the event information;
   identify a domain belonging to the identified at least one virtual volume, on the basis of the resource information;
   determine whether the identified at least one virtual volume satisfies a notification condition related to at least one service level for the identified at least one virtual volume on the basis of the event filter information; and
   send the management system a notification in a case that the identified at least one virtual volume satisfies the notification condition, and
   wherein the notification includes an identifier of the identified at least one virtual volume, information regarding at least one service level violation, an identifier of the identified domain belonging to the identified at least one virtual volume, and an identifier of the failure part of the computer system.

2. The computer system according to claim 1,
   wherein the notification includes the identifier of the identified at least one virtual volume, the information regarding the at least one service level violation, and information regarding at least one service level for the identified at least one virtual volume.

3. The computer system according to claim 1,
   wherein the identifier of the identified at least one virtual volume and the information regarding the at least one service level violation are displayed by the management system on the basis of the notification.

4. The computer system according to claim 2,
   wherein the notification includes the identifier of the identified at least one virtual volume, the information regarding the at least one service level violation, and the information regarding the at least one service level for the identified at least one virtual volume are displayed by the management system on the basis of the notification.

5. The computer system according to claim 1,
   wherein the identifier of the domain related to the failed part of the computer system, and the identifier of the failed part of the computer system are displayed by the management system on the basis of the notification.

6. The computer system according to claim 1,
   wherein the information regarding the at least one service level violation, the identifier of the domain related to the failed part of the computer system, and the identifier of the failed part of the computer system are displayed by the management system on the basis of the notification.

7. A notification method for a computer system including:
   at least one storage apparatus having at least one controller and at least one storage device, and providing a plurality of virtual volumes;
   at least one server having at least one processor and at least one memory, and providing a plurality of virtual servers;
   a management system managing a plurality of domains, the plurality of domains includes the one or more virtual volumes and at least one virtual server; and
   an event notification system having event filter information and resource information, the event filter information managing notification conditions related to service levels for the plurality of virtual volumes, the resource information managing a relationship between the plurality of domains, the plurality of virtual volumes and the plurality of virtual servers,
   wherein when a failure occurs in the computer system, the notification method comprising the steps of:
   receiving an event information from the computer system, the event information indicates content of the failure and a failure part of the computer system;
   identifying at least one virtual volume related to the failure part of the computer system in the plurality of virtual volumes on the basis of the event information;
   identify a domain belonging to the identified at least one virtual volume, on the basis of the resource information;

determining whether the identified at least one virtual volume satisfies a notification condition related to at least one service level for the identified at least one virtual volume on the basis of the event filter information; and sending the management system a notification in a case that the identified at least one virtual volume satisfies the notification condition, and wherein the notification including an identifier of the identified at least one virtual volume, information regarding at least one service level violation, an identifier of the identified domain belonging to the identified at least one virtual volume, and an identifier of the failure part of the computer system.

8. The notification method according to claim 7, further comprising the step of displaying the identifier of the identified at least one virtual volume and the information regarding the at least one service level violation on the basis of the notification.

9. The notification method according to claim 7, further comprising the step of displaying the identifier of the domain related to the failed part of the computer system and the identifier of the failed part of the computer system on the basis of the notification.

* * * * *